United States Patent [19]

Nakamura et al.

[11] Patent Number: 5,818,607
[45] Date of Patent: Oct. 6, 1998

[54] IMAGE SIGNAL PROCESSING APPARATUS AND INFORMATION TRANSMISSION/RECEPTION APPARATUS

[75] Inventors: Kouzou Nakamura, Hitachiota; Yasushi Yokosuka, Nakaminato, both of Japan

[73] Assignee: Hitachi, Ltd., Tokyo, Japan

[21] Appl. No.: 604,289

[22] Filed: Feb. 21, 1996

Related U.S. Application Data

[63] Continuation of Ser. No. 128,290, Sep. 29, 1993, abandoned.

[30] Foreign Application Priority Data

Sep. 30, 1992 [JP] Japan .................................. 4-261076
Nov. 18, 1992 [JP] Japan .................................. 4-308652

[51] Int. Cl.$^6$ .............................. H04N 1/41; G06K 9/34
[52] U.S. Cl. ........................ 358/426; 358/434; 358/468; 382/180; 382/232
[58] Field of Search .................................. 358/426, 447, 358/488, 434, 438, 404, 442, 468; 382/175, 180, 184, 177, 195, 199, 201, 232; 711/150, 168

[56] References Cited

U.S. PATENT DOCUMENTS

| 4,189,711 | 2/1980 | Frank ....................................... 382/180 |
| 4,270,148 | 5/1981 | Adachi .................................... 358/431 |
| 4,301,479 | 11/1981 | Fukinuki et al. ....................... 358/431 |
| 4,342,052 | 7/1982 | Rackley et al. ......................... 358/450 |
| 4,503,556 | 3/1985 | Scherl et al. ............................ 382/180 |
| 4,542,378 | 9/1985 | Suganuma et al. ..................... 358/450 |
| 4,586,088 | 4/1986 | Kondo ..................................... 358/431 |
| 4,654,719 | 3/1987 | Tomita .................................. 358/261.4 |
| 4,760,461 | 7/1988 | Sato ...................................... 358/261.4 |
| 5,051,843 | 9/1991 | Hayashi ................................. 358/450 |
| 5,068,913 | 11/1991 | Sugiura .................................. 382/175 |
| 5,086,434 | 2/1992 | Abe et al. .............................. 358/450 |
| 5,109,281 | 4/1992 | Kobori et al. .......................... 358/450 |
| 5,119,210 | 6/1992 | Baba ....................................... 358/444 |
| 5,351,136 | 9/1994 | Wu et al. ................................ 358/440 |
| 5,572,601 | 11/1996 | Bloomberg ............................. 382/175 |

FOREIGN PATENT DOCUMENTS 0215170  12/1983  Japan .................................... 358/431

Primary Examiner—Edward L. Coles
Assistant Examiner—Madeleine AV Nguyen
Attorney, Agent, or Firm—Antonelli, Terry, Stout & Kraus, LLP

[57] ABSTRACT

An information transmission/reception apparatus having a reader for reading an image and outputting an image signal of the image, an encoder having a plurality of line memories for storing the image signal for encoding the image signal into a code signal while always confirming that the image signal of at least one line is stored in the line memories, a transceiver for transmitting and receiving the code signal, a decoder having a plurality of line memories for storing the image signal represented by the code signal, the decoder decoding an input code signal from one of a page top position and a page intermediate position, and a recorder for recording the image signal decoded by the decoder, thereby while an image signal is being decoded without using a page memory, a split or overlapping recording of pages can be carried out.

4 Claims, 31 Drawing Sheets

FIG. 5

406-4 : ANALYZER TABLE

| INPUT CODE WORD | ANALYZED RESULT | CODE WORD LENGTH |
|---|---|---|
| 0001 | P | 4 |
| 001 | H | 3 |
| 1 | V0 | 1 |
| 011 | VR1 | 3 |
| 000011 | VR2 | 6 |
| 0000011 | VR3 | 7 |
| 010 | VL1 | 3 |
| 000010 | VL2 | 6 |
| 0000010 | VL3 | 7 |

| LINE MEMORY | LINE MEMORY POINTER | | |
|---|---|---|---|
| | 0 | 1 | 2 |
| 1ST | TRANSFER | DECODE | REFERENCE |
| 2ND | REFERENCE | TRANSFER | DECODE |
| 3RD | DECODE | REFERENCE | TRANSFER |

FIG. 18

| 402-1 | SOFT RESET REGISTER |
|---|---|
| 402-2 | CONTROL REGISTER |
| 402-3 | STATUS REGISTER |
| 402-4 | CONFIGURATION REGISTER |
| 402-5 | INTERRUPT REQUEST SOURCE REGISTER |
| 402-6 | INTERRUPT REQUEST MASK REGISTER |
| 402-7 | INTERRUPT REQUEST RESET REGISTER |
| 402-8 | CODE INPUT REGISTER |
| 402-9 | RTC REGISTER |
| 402-10 | ONE LINE PIXEL NO. REGISTER |
| 402-11 | DECODED LINE NO. REGISTER |
| 402-12 | DUPLICATE RECORD LINE NO. REGISTER |
| 402-13 | DUPLICATE RECORD START IMAGE MEMORY ADDRESS REGISTER |
| 402-14 | IMAGE MEMORY ADDRESS REGISTER |
| 402-15 | ERROR MARK WHITE DATA START ADDRESS REGISTER |
| 402-16 | ERROR MARK BLACCK DATA START ADDRESS REGISTER |
| 402-17 | TOTAL DECODED LINE NO. COUNT REGISTER |

FIG. 19

402-3 : STATUS REGISTER

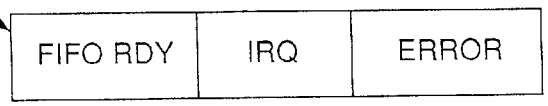

FIG. 20

402-4 : CONFIGURATION REGISTER

| CODING MODE | ERROR MARK ENABLE | PAGE START | ERROR INTERCEPTION | IMAGE MEMORY TRANSFER ENABLE | I/O TRANSFER ENABLE | DISPLICATE RECORD INSTRUCTION | INFINITE LENGTH LINE PROCESS | PAEG END OUTPUT ENABLE |

402-5 : INTERRUPT REQUEST SOURCE REGISTER 402-6 : INTERRUPT REQUEST MASK REGISTER

IMAGE SIGNAL PROCESSING APPARATUS AND INFORMATION TRANSMISSION/ RECEPTION APPARATUS

This application is a continuation application Ser. No. 08/128,290, filed Sep. 29, 1993, now abandoned.

BACKGROUND OF THE INVENTION

The present invention relates to an image signal processing apparatus for encoding an image signal into a code signal and decoding a code signal into an image signal at a high speed. More particularly, the invention relates to an image signal processing apparatus and an information transmission and reception apparatus for encoding a bit map image signal into a code signal and decoding a code signal into an image signal at a high speed.

In a facsimile apparatus for transmitting white-and-black binary image data, MH, MR, MMR encoding schemes are used to improve the transmission efficiency as recommended by CCITT (Consultative Committee in International Telegraphy and Telephony). Apparatuses of this type are, for example, M66330SP/FP disclosed in Mitsubishi Semiconductor Data Book and HD63185FS (DICEP-E) disclosed in the User Manual published by the semiconductor department of Hitachi Ltd.

If the number of transition points per unit length is large, the encoding speed lowers and the amount of encoded codes increases. When the number of transition points per unit length exceeds a certain limit, the amount of encoded codes exceeds the number of image data bits. A technique of reducing the amount of encoded codes is disclosed in JP-A-61-252765.

High speed image signal decoding systems for decoding an encoded image signal into an original image signal at a high speed are known as in the following.

In a "plain paper laser facsimile" described in the magazine Denshi Gijutsu, 1990-8, a decoded image signal is stored in a page memory having a capacity of more than one page, and the stored image signal is outputted at a constant high speed to a laser printer.

In the Publication JP-A-59-126368, an encoded signal supplied via a system bus is decoded by accessing an image signal on a reference line stored in an image memory connected to an image bus. The decoded image signal is stored in the image memory and outputted to a printer.

In the article "Introduction of ASIC to High Speed Facsimile" of the magazine Denshi Gijutsu, 1988-4, an encoded signal supplied via a system bus is decoded in real time. The decoded image signal is directly outputted to a laser printer without storing it in a page memory.

In the Publication JP-A-62-133865, an image signal of one page can be recorded on two pages and the same partial image can be recorded on both the bottom portion of the first page and the top portion of the second page, by switching between the input image signal nd the image signal stored in the image memory.

SUMMARY OF THE INVENTION

It is an object of the present invention to provide an image signal processing apparatus and an information transmission and reception apparatus, capable of encoding an image signal into a code signal and decoding a code signal into an image signal to record it, at a high speed.

It is another object of the present invention to provide a high speed image signal processing apparatus and a high speed information transmission and reception apparatus capable of setting the input bit rate of an image signal at least to the coding operation speed while ensuring the reliable transmission and reception of a code signal.

According to one aspect of the present invention, there is provided an image signal processing apparatus comprising: encoding unit having a plurality of line memories for storing an input image signal, the encoding unit encoding the image signal into a code signal while always confirming that the image signal of at least one line is stored in the line memories; and decoding unit having a plurality of line memories for storing the decoded image signal, the decoding unit decoding an input code signal from a page intermediate position as well as one of a page top position.

The decoding unit is connected via an image bus to at least an image memory and a recording unit for recording the image signal, the image memory storing a decoded image signal of a plurality of lines.

The decoding unit includes at least a code analyzer, the plurality of line memories for storing the decoded image signal, a transition point calculator, an image signal recovering unit, a register group, a control sequencer, and a transfer unit, respectively connected to a bus, the code analyzer analyzing the code signal, the transition point calculator calculating a transition point of the code signal related image signal stored in one of the line memory, the image signal recovering unit recovering the image signal from the code signal related image signal at the area from an address one point before the transition point address and to the transition point address, the register groups storing at least the number of lines of the image signal and the transition point address, the control sequencer controlling the sequence of the decoding operation, and the transfer unit transferring the recovered image signal stored in one of the line memories to the image bus via an image bus interface.

The control sequencer includes at least an error detecting unit for detecting an error of the code signal related image signal and informing an error to the transfer unit.

The register group includes a decoded line number storing register for storing the number of decoded lines of the image signal and a decoded line number managing register for updating the contents of the decoded line number storing register each time one line has been decoded. The decoded line number managing register initializes the contents of the decoded line number register when the decoding operation starts from the page top position, and does not initiate the contents when the decoding operation starts from the page intermediate position.

The register group includes an address register for storing an address of the image signal and a transfer line number register for storing the number of lines of the image signal to be outputted to the recording unit.

The register group includes a first position setting register for storing the position to forcibly change the decoded image into a white pixel signal when the image signal on the line with the error is outputted to the image memory and the recording unit, and a second position setting register for storing the position to forcibly change the decoded image into a black pixel signal when the image signal on the line with the error is outputted to the image memory and the recording unit.

The register group includes a first register for instructing addition of an error mark to the image signal on the line with the error, if the control sequencer instructs the first register to add the error mark, and outputs the image signal with the error mark to the recording unit and the image memory.

The register group includes a register for receiving an instruction to judge whether the decoding operation is continued until an end-of-page signal is received.

The code analyzer includes at least an analyzer sequencer responsive to a decoding instruction from the control sequencer, a code input unit for receiving the code signal in response to a shift instruction from the analyzer sequencer, a final signal detector for decoding a code signal representing an end-of-line, an analyzer table responsive to an operation instruction signal from the analyzer sequencer for receiving the code signal from the code input unit and analyzing the code signal, and an analyzing result latch for temporarily storing the analyzed code supplied from the analyzer table.

The analyzer sequencer includes at least a start instruction setting unit for setting a start of the decoding operation.

The transition point calculator includes at least a transition point address calculator sequencer responsive to an instruction signal from the control sequencer for outputting an operation instruction signal, an analyzed result latch responsive to the operation instruction signal from the calculator sequencer for latching the analyzed result, a decoded line transition point address calculator unit, a reference line access unit responsive to the operation instruction signal from the calculator sequencer for receiving the image signal of a reference line of one word from a reference line memory, and a transition point address detector for detecting a transition point address and outputting the transition point address, wherein an address of the transition point of the image signal on the decoded line is calculated from the analyzed result and the word address and bit address of the transition point.

The image signal recovering unit includes at least a recovery sequencer responsive to an instruction signal from the control sequencer, a decoded line transition point address input latch for receiving the decoded line transition point address from the transition point calculator and outputting the decoded line transition address, and a line image signal generator unit for generating the image signal by changing pixels at the area from the address one point before the transition point address to the transition point address into ones of white pixels and black pixels and outputting the changed image signal to one of the line memories.

The transfer unit includes at least a transfer controller responsive to an instruction signal from the control sequencer for instructing to output the image signal in one of the image memories, a transfer memory controller responsive to an instruction signal from the transfer controller for accessing the one of the line memories, an error mark adding unit responsive to an error mark adding instruction signal from the transfer memory controller for adding an error mark of ones of white pixels and black pixels and outputting the image signal, and an image memory controller responsive to the instruction signal from the transfer controller for outputting an address and control signal for the image memory.

The encoding unit includes at least three line memories to be used cyclically as an image signal storage line, an encode line, and a reference line, and an encoding control unit for controlling the encoding operation one line after another, by always confirming that the image signal of at least one line is stored in the line memories, such that when the image signal of at least one line is stored in the line memories, the encoding operation of the image signal of one line starts by referencing the image signal on the reference line and at the same time the image signal to be next encoded is stored in the remaining line memory.

The encoding control unit includes at least an image signal input unit for receiving the image signal, a control sequencer for controlling the encoding operation, an encoding logic unit for encoding the image signal in accordance with one of an MH, MR, MMR, and run-length encoding schemes, a system interface unit for interfacing with an external system controller, and a code output unit for outputting the code signal supplied from the encoding logic unit.

The external system controller connected to the system interface unit executes necessary initial settings of encode registers provided in the encoding control unit and instructs to start the encoding operation.

The image input unit includes an image signal input controller for controlling the input of the image signal and a signal representing an end-of-page, and a line memory controller for receiving the image signal of one line and judging the contents of the image signal, the judgement including counting the number of the transition points and counting the number of black pixels.

The system interface includes the encode registers for setting various parameters required for the encoding operation, a control signal input/output unit for controlling data transfer between the system controller and the system interface unit, an interface control unit for interfacing between the system interface unit and the code signal output unit, the encode registers including a maximum value register for storing the maximum value of the transition points of one line, and the control signal input/output unit including a terminal for outputting an interrupt signal representing the interrupt of the encoding operation at one of encoded lines or at the end-of-page, to the system controller, and a terminal for setting one of an 8-bit bus and a 16-bit bus.

The control sequencer instructs the encoding operation by one of the MH, MR and MMR encoding schemes when the number of counted transition points in a line of the image signal supplied to the line memories is greater than a predetermined value, and instructs the encoding operation by an uncompression encoding scheme when the number is greater than the value.

The control sequencer instructs the uncompression encoding scheme when the image signal supplied to the line memories conforms with one of a one-dimensional encoding scheme and a two-dimensional encoding scheme, in accordance with predetermined values set differently for the one- and two-dimensional encoding schemes.

The control sequencer includes a counter for counting the number of encoded lines of the image signal.

The encode registers include at least a register for setting the value of the number of encoded lines, a register for setting the configuration of the encoding operation, a register for setting the start position of the encoding operation from one of the page top position and the page intermediate position, and a register for setting one of the number of RTC codes for the MH and MR encoding schemes and the number of E of B codes for the MMR encoding scheme.

The encode registers further include a first register for setting a predetermined number of black pixels for determining that the image signal of one line is a black pixel line if the number of detected black pixels is greater than the predetermined number in which the image signal of one line is determined as a white line if the number of the black pixels is smaller than the predetermined number, and a second register for setting the number of consecutive black lines.

According to another aspect of the present invention, there is provided an information transmission/reception apparatus comprising: unit for reading an image and outputting an image signal of the image; encoding unit having a plurality of line memories for storing the image signal for encoding the image signal into a code signal while always confirming that the image signal of at least one line is stored in the line memories; unit for transmitting and receiving the code signal; decoding unit having a plurality of line memories for storing the image signal decoded by the code signal, the decoding unit decoding an input code signal from one of a page top position and a page intermediate position; and recording unit for recording the image signal decoded by the decoding unit.

If an original of one page has codes which cannot be recorded on one recording paper, the decoding is interrupted when codes of one recording paper have been decoded. After the next recording paper is set, the decoding starts from the next code. It is therefore possible to record an original of one page having codes unable to be recorded on one recording paper, on two recording papers in real time without using a page memory.

An end-of-page or end-of-block code is notified to the recorder when the code is decoded. The recorder therefore can record an original containing codes more than or less than one recording paper without using a page memory while decoding in real time.

A decoded image signal is outputted to both the recorder and the image memory. After transferring the image signal stored in the image memory, the newly decoded image signal is outputted to both the recorder and the image memory. It is therefore possible to record an original having codes more than one recording paper without using a page memory, and to record the same image signal on both the bottom portion of the first page and the top portion of the second page.

An error mark is added to the image signal of a line with an error and outputted to the recorder. It is therefore possible to record an error mark on a recording paper without using a page memory.

A maximum constant speed of inputting an image signal both in the main and subsidiary scan lines of a line sensor is ensured. If the image signal input speed is set slower than the maximum speed, the image signal input speed is not required to be controlled in accordance with the coding speed. It is therefore possible to simplify the system control. Since the image signal can be inputted at a constant speed, a buffer RAM between the recorder and the image signal processing apparatus is not necessary, reducing the cost.

BRIEF DESCRIPTION OF THE DRAWINGS

FIG. 5 shows an analyzer table of the image signal processing apparatus.

FIG. 18 is a table showing registers for the decoding operation.

FIG. 19 is a detailed diagram of a status register.

FIG. 20 is a detailed diagram of a configuration register.

DESCRIPTION OF THE PREFERRED EMBODIMENTS

Embodiments of the present invention will be described with reference to the accompanying drawings.

It is assumed in the following description that an image signal to be processed by an image signal processing apparatus of the present invention is a bit map binary image signal commonly used by a facsimile apparatus, and that codes are international standards codes MH, MR, and MMR stipulated by Recommendations T.4 and T.6 of CCITT (Consultative Committee in International Telegraphy and Telephony).

It is also assumed that recording means is a laser printer commonly used by a facsimile apparatus which records one page at a time and has a predetermined page size, and predetermined time/page and time/line, and that pixels are coded one line after another and one page has an optional number of lines.

The above assumptions are not intended to limit the scope of the present invention, but they are employed only for the description of particular embodiments, and other coding schemes and apparatus other than facsimile apparatuses may also be used.

Figure 1:
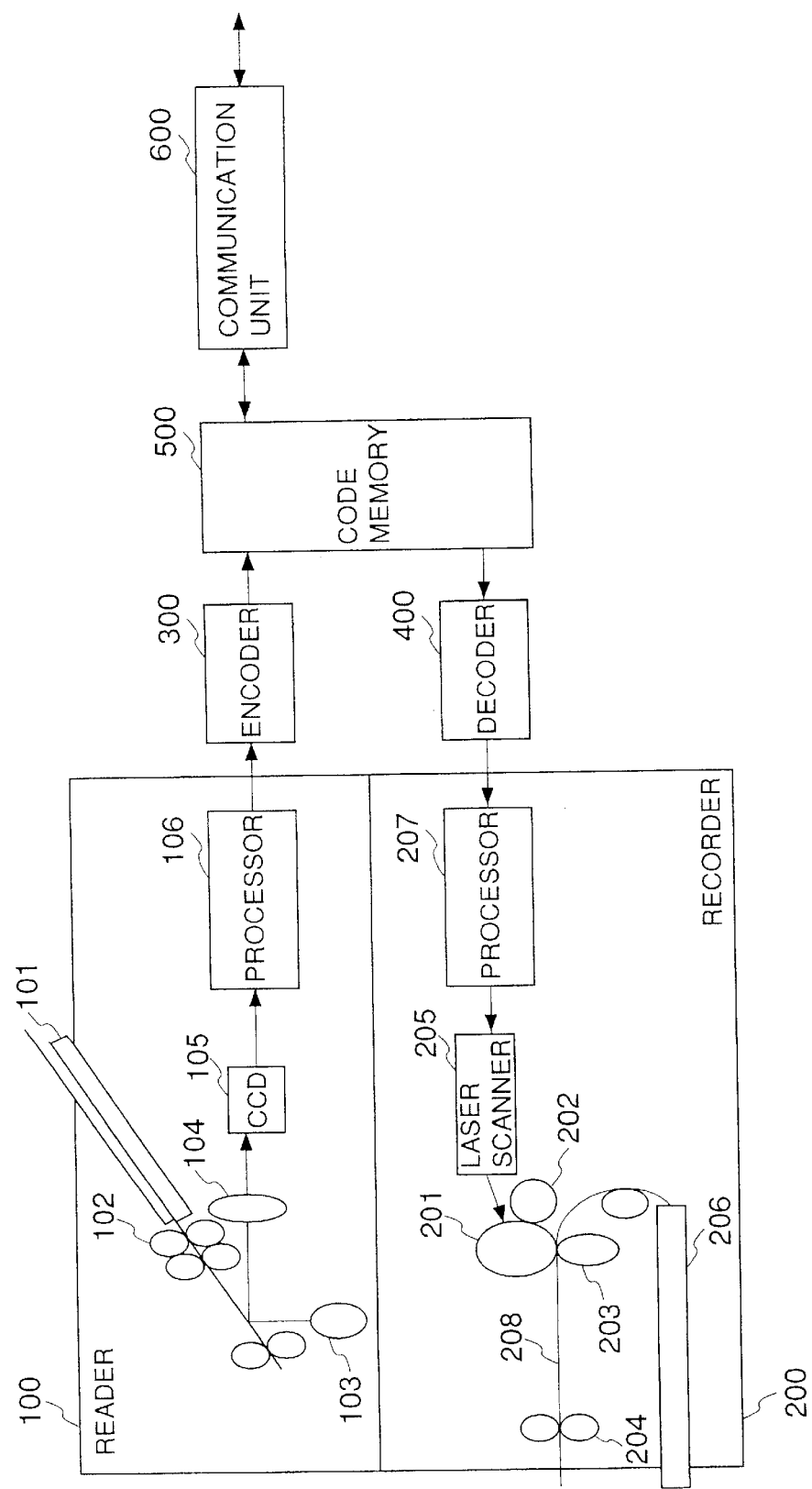
FIG. 1 is a schematic diagram showing a facsimile apparatus using the image signal processing apparatus of the present invention.

FIG. 1 shows the overall structure of a facsimile apparatus using the image signal processing apparatus of the present invention.

Referring to FIG. 1, the facsimile apparatus is constituted by a reading unit 100, a recording unit 200, an encoder 300, a decoder 400, a code memory 500, a communication unit 600, and an unrepresented system controller. The reading unit 100 has an original support 101, an automatic original feeder 102, a fluorescent lamp 103, a lens system 104, a charge coupled device (CCD) 105, an image signal processor 106, and other elements. The recorder unit 200 has a photosensitive drum 201, a developer 202, a transfer unit 203, a paper transport system 204, a laser scanner 205, a paper cassette 206, an image signal processor 207, a recorded copy 208, and other elements.

The outline of the operation of the facsimile apparatus is as follows.

At the reading unit 100, the automatic original feeder 102 transports an original set on the original base 101 in the subsidiary scan direction. An optical signal reflected by the surface of the original is supplied via the lens system 104 to CCD 105 one line after another in the main scan direction. The optical signal of each line is converted into an electric signal by CCD 105. This electric signal is converted into a binary image signal of high quality by the processor 106. The binary image signal is supplied to the encoder 300 to encode it. The encoded signal is stored in the code memory 500. The communication unit 600 transmits codes stored in the code memory 500 via a communication line to a destination facsimile apparatus (not shown). The communication unit 600 also receives codes transmitted from another facsimile apparatus and stores them in the code memory 500. The decoder 400 decodes the codes supplied from the code memory 500 into an image signal which is then supplied to the recording unit 200. At the recording unit 200, the processor 207 processes the image signal to obtain a signal of high quality. This signal is supplied to the laser scanner 205 to form a latent image on the photosensitive drum 201. The latent image is developed by the developer 202 by adding toner. The toner is transferred to a recording paper by the transfer unit 203 and fixed as a recorded copy.

Figure 2:
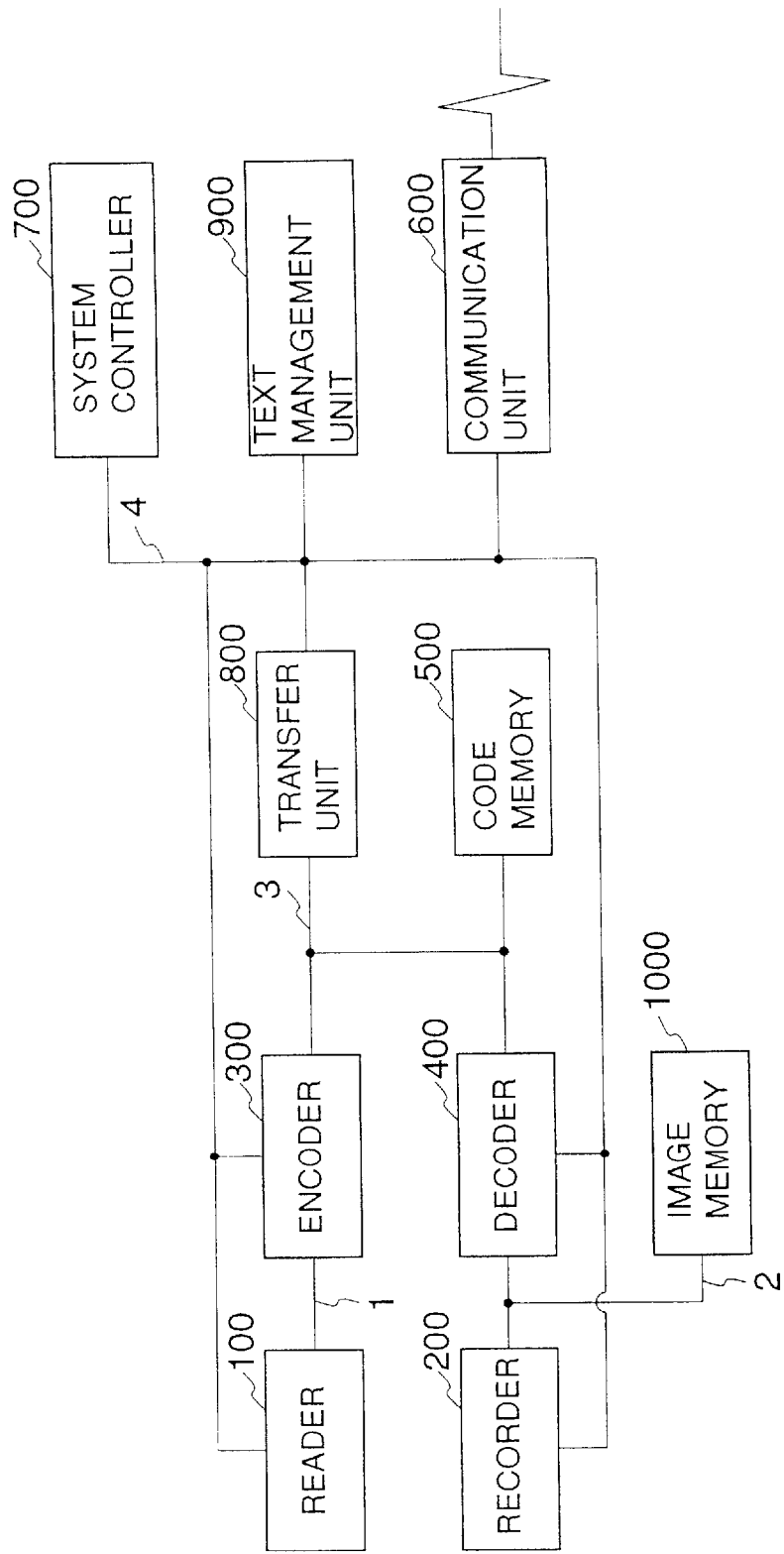
FIG. 2 is a circuit diagram in block showing the structure of a facsimile apparatus using the image signal processing apparatus of the present invention.

FIG. 2 is a block diagram illustrating the signal flow and operation of the facsimile apparatus of the present invention. In FIG. 2, reference numeral 1 represents a first image bus, reference numeral 2 represents a second image bus, reference numeral 3 represents a code bus, reference numeral 4 represents a system bus, reference numeral 700 represents a system controller, reference numeral 800 represents a code transfer unit, reference numeral 900 represents a text management information storage unit, and reference numeral 1000 represents an image memory. Like elements to those shown in FIG. 1 are represented by using identical reference numerals.

The operation of the facsimile apparatus will be described.

A transmission operation will be described first. An image signal read by the reading unit 100 is transferred via the first image bus 1 to the encoder 300. The encoder 300 encodes the image signal into codes which are outputted to the code bus 3. The transfer unit 800 transfers the codes on the code bus 3 to the code memory 500, and also reads the codes stored in the code memory 500 to the code bus 3 and outputs them to the communication unit 600. The communication unit 600 transmits the codes supplied via the system bus 4 to a destination facsimile apparatus (not shown). The system controller 700 controls elements of the facsimile apparatus via the system bus 4. For example, the system controller 700 sets a transfer start address to the code transfer unit 800 when transferring codes from the encoder 300 to the code memory 500, sets page/communication management information (start address, page code amount, and the like) of the codes stored in the code memory 500 to the text management information storage unit 900, and sets parameters and instructions to the encoder 300 and decoder 400. The text management information storage unit 900 stores the page/communication management information of the codes stored in the code memory 500.

Next, a reception operation will be described. The code transfer unit 800 operates to store a signal received by the communication unit 600 in the code memory 500 via the system bus 4 and code bus 3. The system controller 700 sets the management information of the codes stored in the code memory 500 to the text management information unit 900. When the codes of one page or more are stored in the code memory 500, the system controller 700 instructs the code transfer unit 800, decoder 400, and recording unit 200 to record the coded text stored in the code memory 500. The decoder 400 responds to an image signal request from the recording unit 200 in real time, decodes the image signal supplied from the code bus 3, and supplies the decoded image signal to the recording unit 200 via the second image bus 2. At the same time, in response to an instruction from the system controller 700, the decoded image signal is stored in the image memory 1000 via the second image bus 2. The image memory 1000 has a capacity of only several lines to be written in duplicate on the next page. After one page has been recorded by the recording unit 200, the image signal stored in the image memory 1000 is read and recorded in duplicate on the next page at the recording unit 200 in response to an instruction from the system controller 700. The recording unit 200 records the image signal supplied via the second image bus 2 on a recording paper at a constant speed one page after another. As described above, when the system controller 700 instructs to transfer the image signal stored in the image memory 1000, the decoder 400 operates to transfer it to the recording unit 200 and thereafter, the decoder 400 decodes the following image signal and sends it to the recording unit 200. When the decoder 400 outputs the last line image signal of one page to the recording unit 200, it sends also a last line signal to the recording unit 200 and informs the system controller 700 of the completion of one page decoding. Upon reception of the last line signal, the recording unit 200 applies the image signal having been received until the last line signal is received, to the photosensitive drum 201, and thereafter applies a white image signal to the photosensitive drum 201.

The decoder 400 responds in real time to an request from the recording unit, decodes the image signal, and transfers the decoded image signal to the recording unit 200. In this manner, a constant speed record can be realized without using a page memory. The decoder 400 outputs the decoded signal to the recording unit 200 and stores it in the image memory 1000. Thereafter, the image signal stored in the image memory 1000 is transferred to the recording unit 200, and then the newly decoded image signal is transferred to the recording unit 200. Accordingly, the image signal can be recorded in duplicate on the bottom area of the first page and on the top area of the second page by storing the image signal in the image memory 1000, without using a page memory. Since the decoder 400 is connected to the code bus 3 independent from the system bus 4, even a high speed decoding will not increase the load of the system bus 4, and the system controller 700 can access the decoder 400 via the system bus at a desired timing during the decoding operation by the decoder. Further, the decoder 400 supplies the last line signal to the recording unit 200. Accordingly, in the real time decoder without a page memory, an image signal less in amount than one page can be recorded efficiently leaving the area without image signal in white.

Figure 3:
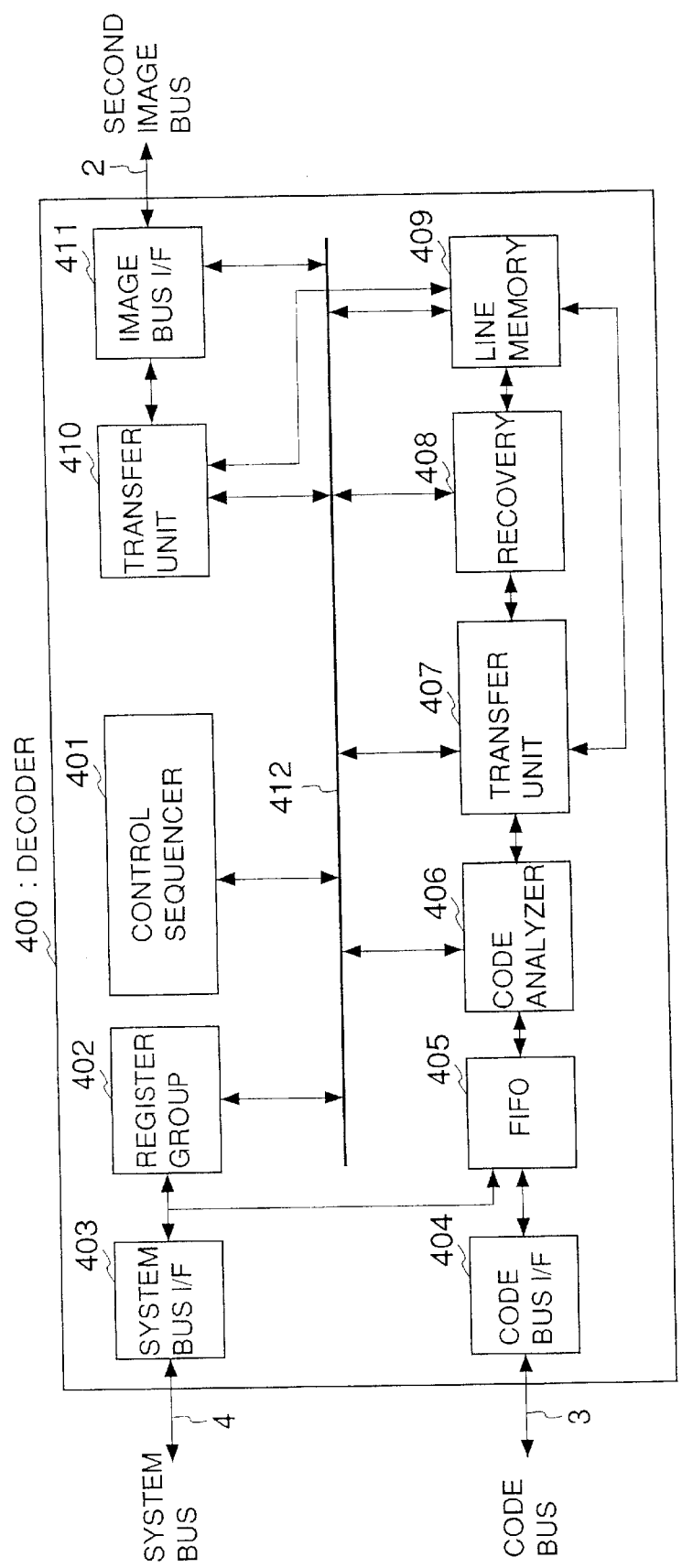
FIG. 3 is a circuit diagram in block showing the structure of an encoder of the image signal processing apparatus.

FIG. 3 is a block diagram of the decoder 400 according to the embodiment of the present invention.

In FIG. 3, reference numeral 401 represents a control sequencer, reference numeral 402 represents a register group, reference numeral 403 represents a system bus interface, reference numeral 404 represents a code bus interface, reference numeral 405 represents a first-in first-out (FIFO) memory, reference numeral 406 represents a code analyzer, reference numeral 407 represents a transition point address calculator, reference numeral 408 represents an image signal recovery unit, reference numeral 409 represents a line memory, reference numeral 410 represents an image signal transfer unit, and reference numeral 411 represents an image bus interface. The control sequencer 401 controls the elements of the decoder 400 via an internal bus 12 to perform a series of decoding operations for decoding codes into an image signal. The details of the control operation will be explained later with reference to the flow charts shown in FIGS. 23, 24, and 25. The register group 402 is used for the setting of the operation parameters of the decoder 400 by the system controller 700 and for notifying the system controller 700 of the operation state of the decoder 400. The details of the register group 402 will be later described with reference to FIG. 18. FIFO 405 temporarily buffers the codes supplied from the code bus 3 and system bus 4 respectively via the code bus interface 404 and system bus interface 403. The code analyzer 406 analyzes the codes supplied from FIFO 405, and outputs the analyzed result to the transition point address calculator 407. The details of the code analyzer 406 will be later described with reference to FIG. 4. The transition point address calculator 407 detects the transition point address of the image signal on a reference line stored in the line memory 409. In accordance with the transition point address and the analyzed results by the code analyzer 406, the transition point address of the image signal on a decode line is calculated and outputted to the image signal recovery unit 408. In accordance with the transition point address of the image signal on the decode line supplied from the transition address calculator 407 and the transition point address one point before the transition point of the image signal on the decode line stored in the image signal recovery unit 408, the image signal recovery unit 408 recovers the image signal between the two transition points and outputs it to the decoded line of the line memory 409. The line memory 409 is a buffer for storing image signals of three lines including the reference line, decoded line, and transfer line. In response to a request from the recording unit 200, the image signal transfer unit 410 transfers the image signal on the transfer line stored in the line memory 409 to the second image bus 2 via the image bus interface 411.

Next, the decoding operation will be described. The decoding operation is instructed by the system controller 700 after it sets the operation parameters (e.g., coding scheme) to the register group 402 via the system bus interface 403. Upon reception of the operation instruction, the control sequencer 401 instructs each element of the decoder 400 to perform a decoding operation in accordance with the operation parameters set to the register group 402. Receiving the operation instruction, each element executes the decoding operation described in the following. FIFO 405 receives codes from the code bus 3 via the code interface 404 if it has an empty space. Codes are supplied in unit of word, e.g., in unit of one byte. The code analyzer 406 receives codes, if any, in FIFO 405, analyzes them in unit of one code word, and outputs the analyzed result. The transition point address calculator 407 receives the image signal on the reference line stored in the line memory 409, calculates the transition point address of the image signal on the reference line, and calculates from the calculated transition point address and the analyzed results by the code analyzer 406 the transition point address of the image signal on the decoded line which is then outputted. In accordance with the transition point address of the image signal on the decoded line and the transition point address one point before the transition point of the image signal on the decoded line stored in the image signal recovery unit 408, the image signal recovery unit 408 recovers the image signal between the two transition points and outputs it to the decoded line of the line memory 409. The above operations of code analyzing, transition point calculating, and image signal recovering are executed in parallel in a pipelining manner on the code word basis. This pipeline operation will be detailed later with reference to FIG. 8. The above operations are repeated for the decoding of codes of one line. After the completion of one line decoding, the code analyzer 406, transition point address calculator 407, and image signal recovery unit 408 inform an end of line to the control sequencer 401. Upon reception of the line end, the control sequencer 401 instructs to change the functions of each line memory of the line memory 409. The functions of the three line memories of the line memory 409 are cyclically switched from the decoded line, reference line, and transfer line in this order. The decoded line is switched to the reference line, the reference line is switched to the transfer line, and the transfer line is switched to the decoded line. The control sequencer 401 supplies a transfer instruction to the transfer unit 410 when a new image signal of one line is recovered on the transfer line of the line memory 409. Upon reception of the transfer instruction and in response to the image signal request from the recording unit 200, the transfer unit 410 transfers the image signal of one line on the transfer line stored in the line memory 409 to the second image bus 2 via the image bus interface 411 on the word unit basis. After the decoding of one line, the control sequencer 401 instructs the code analyzer 406, transition point address calculator 407, and image signal recovery unit 408 to decode the next line. Namely, the image signal transfer process and the code decoding process are executed in parallel in a pipelining manner on the line unit basis. The above operations are repeated for each line until all the codes stored in the code memory 500 are decoded.

The decoder 400 has the line memory 409 for storing image signals of three lines, and are connected to the code bus 3 and second image bus 2 independent from each other.

The operation of decoding the codes supplied from the code bus 3 and the operation of transferring the decoded image signal to the recording unit 3 via the image bus 2 can be executed in parallel in a pipelining manner at a high speed. The decoding operation is executed by the three independent blocks including the code analyzer 406, transition point address calculator 407, and image signal recovery unit 408, allowing the encoding operation to be executed in parallel in a pipelining manner on the cord word unit basis.

Figure 4:
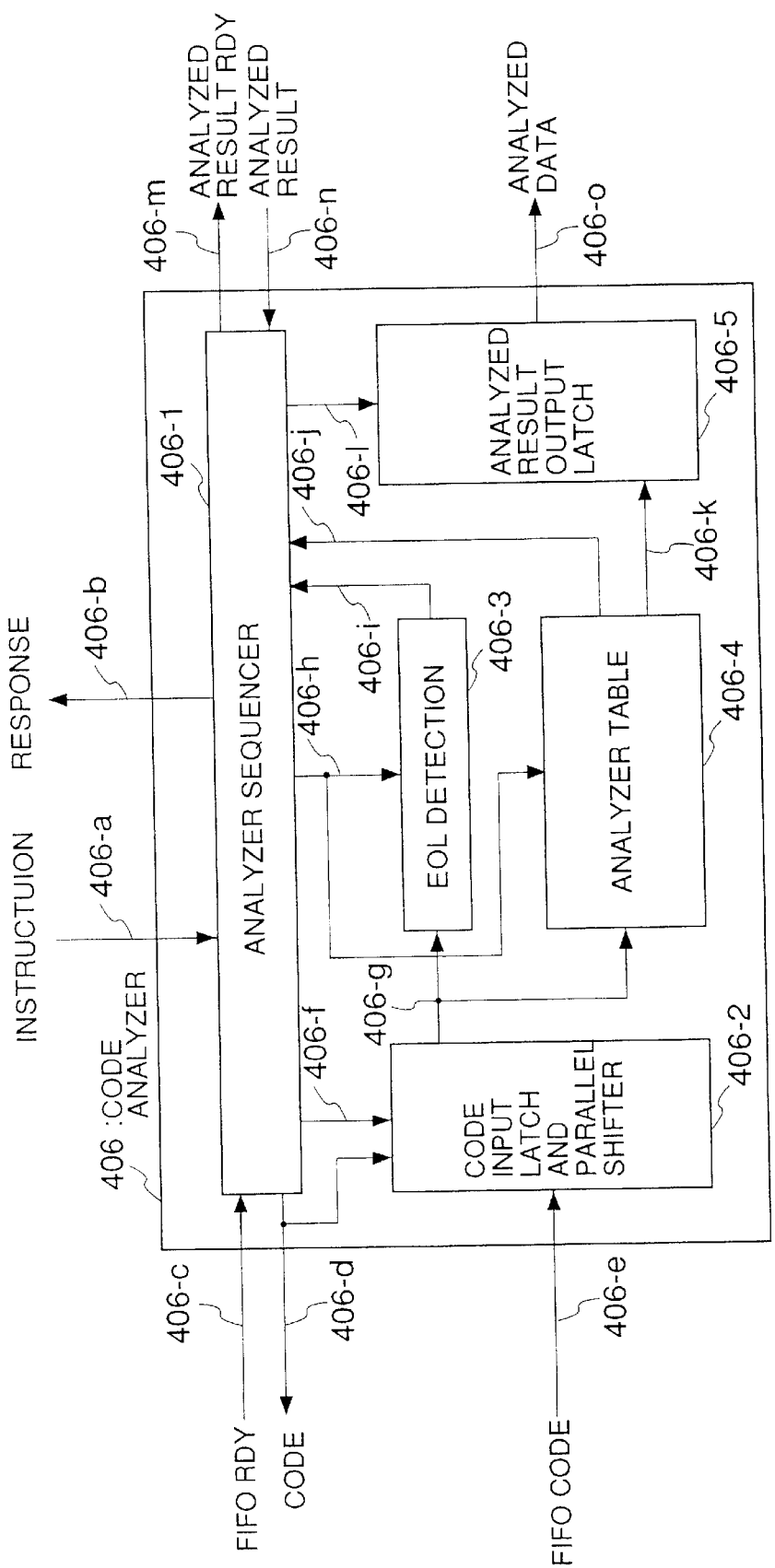
FIG. 4 is a circuit diagram in block showing the structure of a decoder of the image signal processing apparatus.

FIG. 4 is a detailed block diagram of the code analyzer 406 according to the embodiment of the present invention.

In FIG. 4, reference numeral 406-1 represents an analyzer sequencer, reference numeral 406-2 represents a code input latch and barrel shifter, reference numeral 406-3 represents an EOL detector, reference numeral 406-4 represents an analyzer table, and reference numeral 406-5 represents an analyzed result output latch. Reference numerals 406-a to 406-o represents signals at each circuit potion of the code analyzer 406. When the analyzer sequencer 406-1 receives a decoding mode signal 406-a from the control sequencer 401, it outputs a code output signal 406-d if a FIFO ready signal 406-c is active and the code input latch and barrel shifter 406-2 has a space of one word or more. Then, one word of FIFO output codes 406-e is supplied to the code input latch and barrel shifter 406-2. Also upon reception of the decoding mode signal 406-a from the control sequencer 401, the analyzer sequencer 406-1 outputs a decoding mode signal 406-h to the EOL detector 406-3 and decoder table 406-4 which in turn start analyzing the supplied codes 406-g in unit of code word. The analyzer table 406-4 has the contents such as shown in FIG. 5, in the case of MMR codes for example. If the supplied codes 406-g are "011", VR1 is outputted as an analyzed result signal 406-k, and "3" is outputted as a code length signal 406-j. If the supplied codes 406-g is "000000000001", the EOL detector 406-3 outputs an EOL detection and a code length "12" as a detected result signal 406-i. Receiving the code length signal 406-j and analyzed result 406-i, the analyzer sequencer 406-i outputs a latch signal 406-1 signal if the analyzed result output latch 406-5 has an empty space, to thereby latch the analyzed result 406-k. The analyzer sequencer 406-1 also outputs an analyzed result output ready signal 406-m to the transition point address calculator 407, and a shift signal 406-f to the code input latch and barrel shifter 406-2, the shift signal being an instruction to shift bits as many as the bits of the analyzed code word. If the code input latch and barrel shifter 406-2 becomes to have a space of one word or more because of the shift operation and if the FIFO output ready signal 406-c is active, the analyzer sequencer 406-1 outputs the code output signal 406-d to the code input latch and barrel shifter 406-2 to receive one word of FIFO output codes 406-e. When an analyzed result input signal 406-n is received from the transition point address calculator 407, the analyzer sequencer 406-1 judges that analyzed result has been supplied to the transition point address calculator 407, and continues to analyze next codes. The above operations are repeated to analyze one line of codes in unit of code word. When the EOL detection signal 406-i is received, the analyzer sequencer 406-1 supplies a response signal 406-b to the control sequencer 401 to inform the end of one line.

As described above, the code analyzer 406 can analyze codes in unit of code word such as shown in FIG. 5, one code word per one operation cycle (e.g. one machine cycle) at a high speed, by using the analyzer table 406-4 and barrel shifter 406-2. Moreover, detecting an EOL can be executed in parallel to and independently from analyzing a code word, so that an EOL can be reliably detected even if input codes have some errors, so long as a correct EOL code is inputted.

Figure 6:
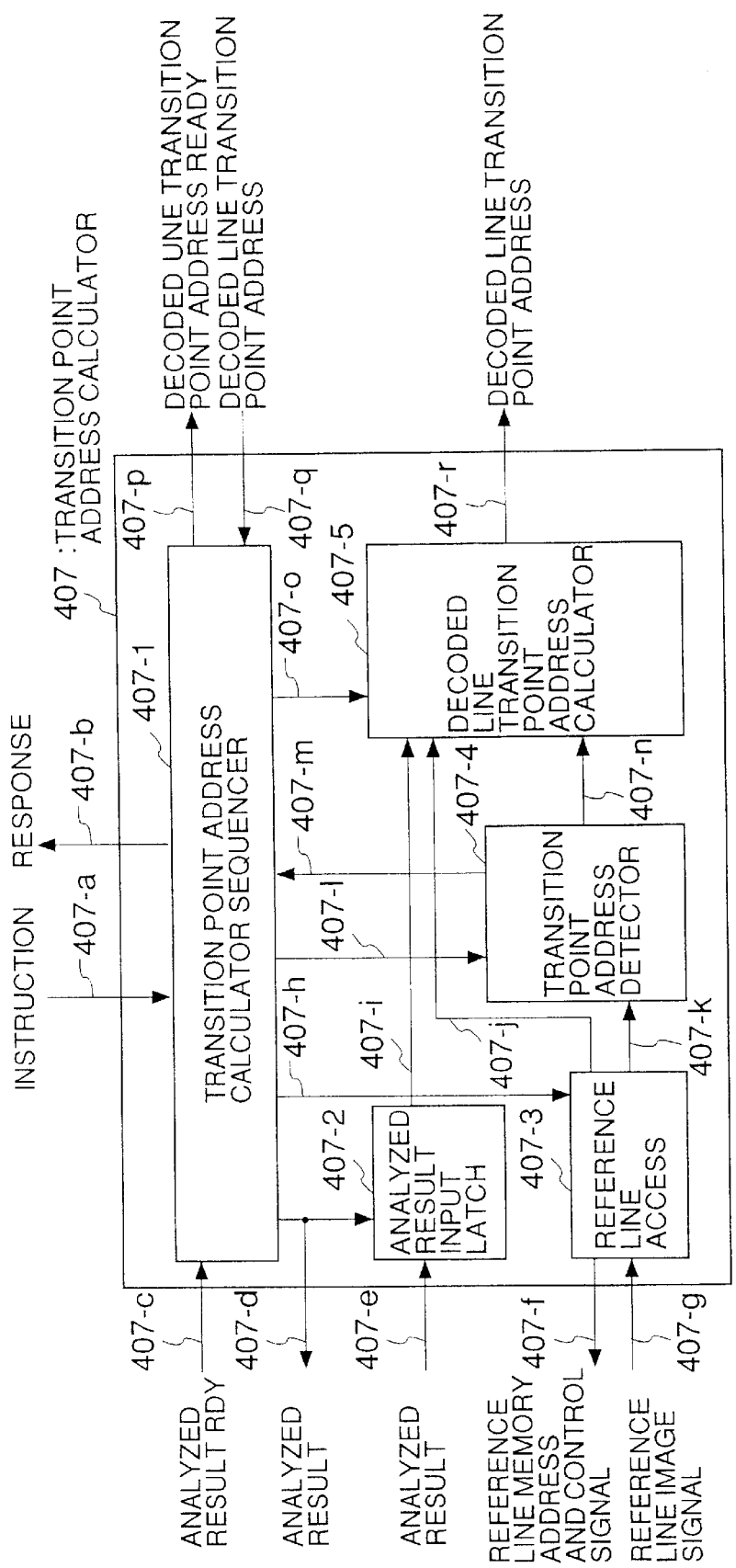
FIG. 6 is a circuit diagram in block showing the structure of a transition point address calculator of the image signal processing apparatus.

FIG. 6 is a detailed block diagram of the transition point address calculator 407 according to the embodiment of the present invention.

In FIG. 6, reference numeral 407 represents a transition point address calculator sequencer, reference numeral 407-2 represents an analyzed result input latch, reference numeral 407-3 represents a reference line access unit, reference number 407-4 represents a transition point address detector, and reference numeral 407-5 represents a decoded line transition point address calculator unit. Reference numerals 407-a to 407-r represents signals at each circuit portions of the transition point address calculator 407. Upon reception of the decoding mode signal 407-a from the control sequencer 401, the transition point address calculator sequencer 407-1 instructs each element of the transition point address calculator 407 to perform a transition point calculation operation. Specifically, the transition point address calculator sequencer 407-1 outputs an operation instruction signal 407-h to the reference line access unit 407-3, and outputs the analyzed result input signal 407-d in response to the analyzed result output ready signal 407-c from the code analyzer 406 to thereafter latch the analyzed result 407-e to the analyzed result input latch 407-2. Upon reception of the operation instruction 407-h, the reference line access unit 407-3 outputs a reference line memory address and control signal 407-f to receive a reference line image signal 407-g in unit of word. The analyzed result input latch 407-2 outputs the latched analyzed result 407-i to he decoded line transition point address calculator unit 407-5. The reference line access unit 407-3 outputs the word address 407-j of the received reference line image signal 407-g to the decode line transition point address calculator 407-5, and outputs the received image signal 407-k to the transition point address detector 407-4. The transition point address detector 407-4 detects a transition point (between black and white) of the received one word image signal 407-k to output the intra-word address (bit address) 407-n and the address detection signal 407-m. A method and circuit for detecting a transition point is detailed in JP-A-59-126368, and so the description thereof is omitted. The transition point address calculator sequencer 407-1 supplies operation instruction signals 407-h and 407-1 to the reference line access unit 407-3 and transition point address detector 407-4, the operation instruction signals being released when the detection signal 407-m is supplied. Then, the operation instruction signal 407-o is supplied to the decode line transition point address calculator unit 407-5, and the decode line transition point address output ready signal 407-p is supplied to the image signal recovery unit 408. Upon reception of the operation instruction signal 407-o, the decode line transition point address calculator unit 407-5 calculates the transition point address 407-r from the supplied analyzed result 407-i, the transition point word address 407-j of the reference line, and the transition point bit address 407-j of the reference line, and outputs the calculated transition point address 407-r to the image signal recovery unit 408. For example, if the word address 407-j is "5", the bit address 407-j is "4", and the analyzed result 407-i is VR1, then the transition point of the decode line is one pixel right from the transition point of the reference line. In this case, the word address of "5" and bit address "5" are outputted as the transition point address 407-r of the decode line. Upon reception of the decoded line transition point address input signal 407-q, the transition point address calculator sequencer 407-1 outputs the instructions for the above operations which are repeated on the code word unit basis to complete the decoding of one line. Thereafter, the response signal 407-b indicating the completion of decoding one line is outputted to the control sequencer 401.

Figure 7:
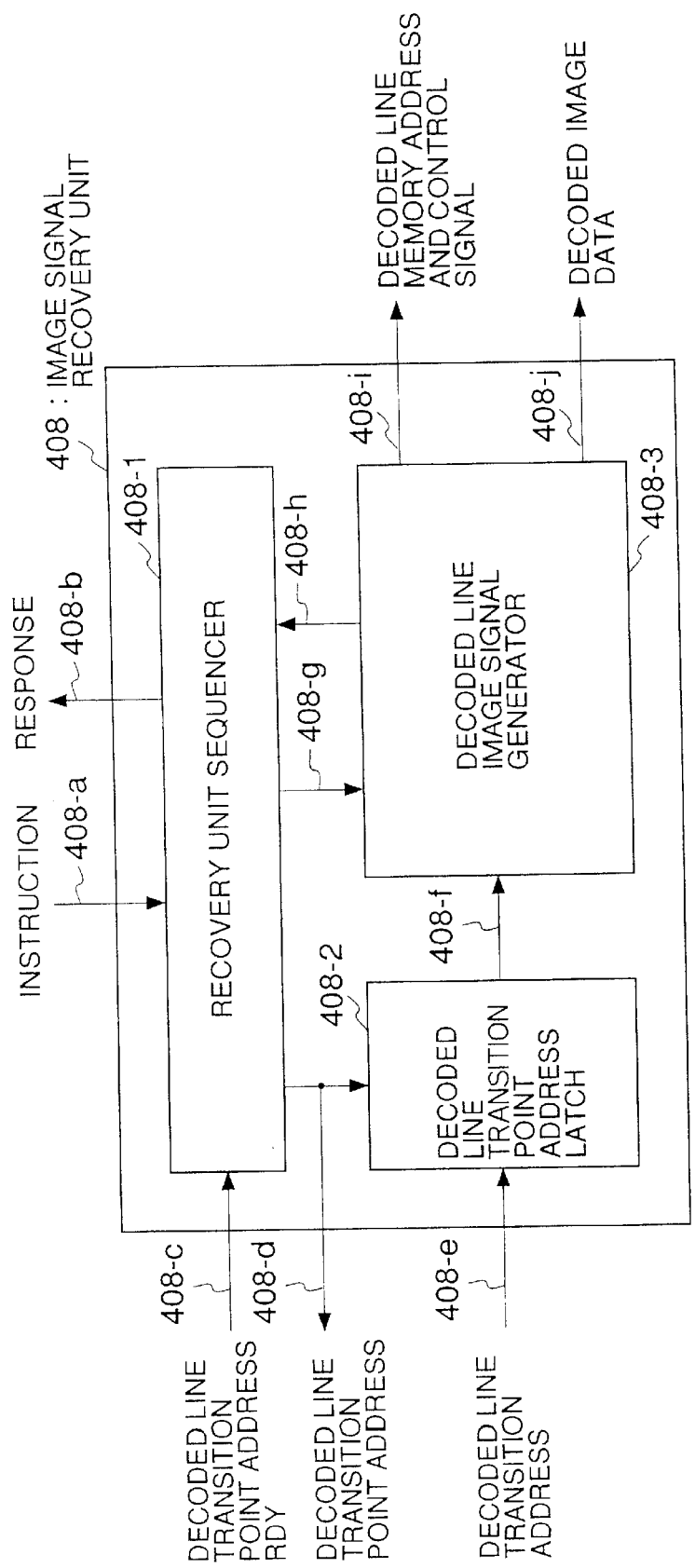
FIG. 7 is a circuit diagram in block showing the structure of an image signal recovery unit of the image signal processing apparatus.

FIG. 7 is a detailed block diagram of the image signal recovery unit 408 according to the embodiment of the present invention.

In FIG. 7, reference numeral 408-1 represents a recovery unit sequencer, reference numeral 408-2 represents a decoded line transition point address latch, and reference numeral 408-3 represents a decoded line image signal generator. Reference numerals 408-a to 408-j represent signals at circuit portions of the image signal recovery unit 408. Upon reception of an operation instruction signal 408-a from the control sequencer 401, the recovery unit sequencer 408-1 supplies an operation instruction to each element of the image signal recovery unit 408. Upon reception of the decoded line transition point address output ready signal 408-c from the transition address calculator 407, the recovery unit sequencer 408-1 outputs the decoded line transition point address input signal 408-d. Then, the decoded line transition point address latch 408-2 latches the decoded line transition point address 408-e supplied from the transition point address calculator 407. Thereafter, the recovery unit sequencer 408-1 outputs an image signal generation instruction signal 408-g to the decoded line image signal generator 408-3 which in turn receives the decoded line transition point address 408-f latched by the decoded line transition point address latch 408-2, and generates an image signal by reversing the white or black pixels between the transition point one point before that stored in the generator 408-3 (i.e., transition point stored one cycle before) and the newly supplied transition point. The generated decode line image signal 408-j and the decoded line memory address and control signal 408-i are outputted, the image signal 408-j being stored in the decode line memory of the line memory 409. The method and circuit for decoding an image signal is detailed in JP-A-59-126368, and so the description is omitted. After outputting the generated image signal, the next decode line transition point address 408-d is supplied to repeat the above operations. After the process of one line, the completion response signal 408-d is supplied to the control sequencer 401 to wait for the next operation instruction.

Figure 8:
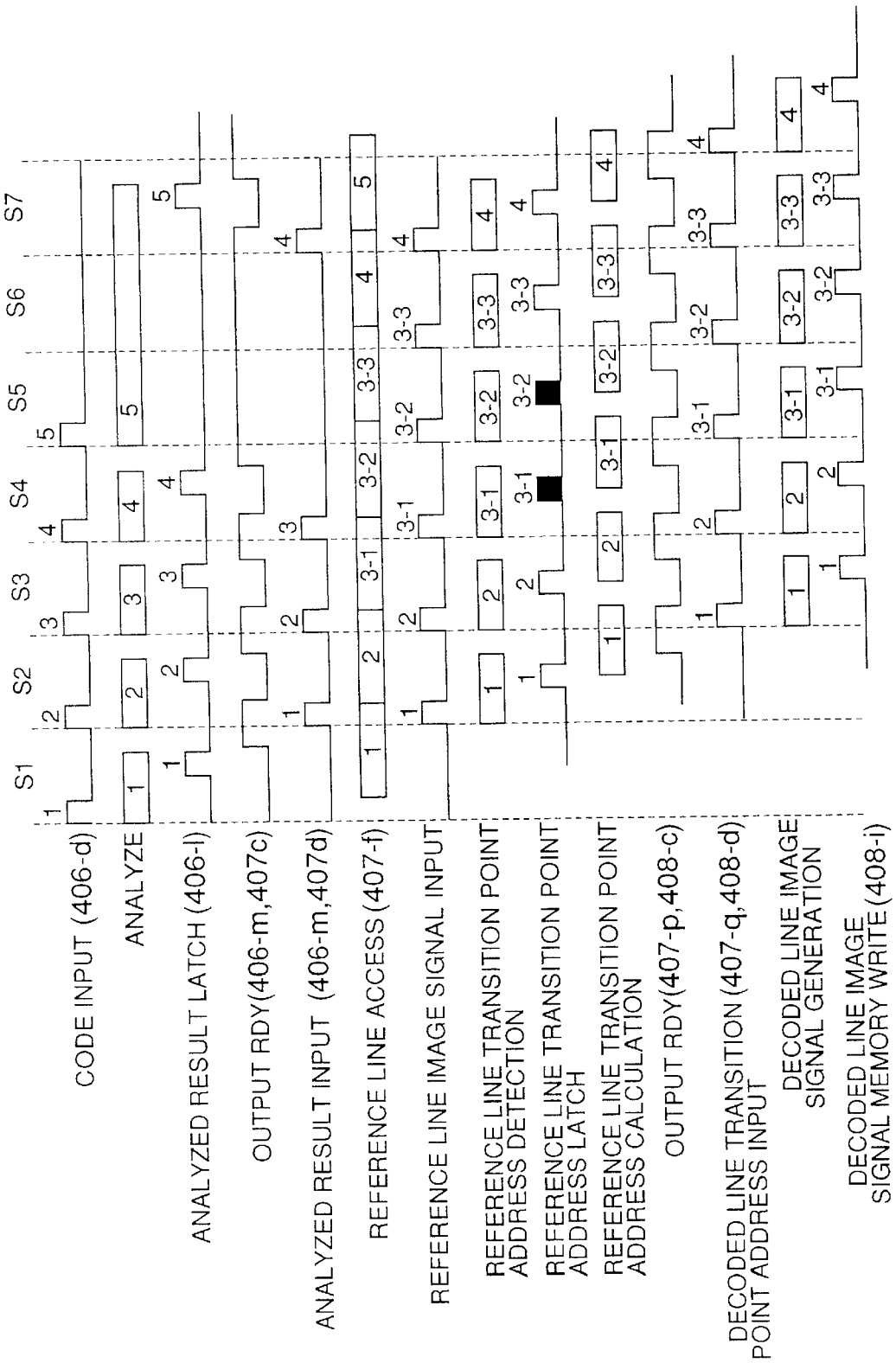
FIG. 8 is a sequence diagram illustrating a pipeline process on the code word basis.

FIG. 8 is a timing chart explaining the pipelining operation in unit of code word by the above-described code analyzer 406, transition point address calculator 407, and image signal recovery unit 408. Reference numerals s1 to s7 represent operation Steps of the decoder 400. The operation is executed one step after another from Step s1 to Step s7. For the simplicity of description, an output of FIFO 405 is assumed to be always ready, and the operation of FIFO 405 is not illustrated in this timing chart. Each Step generally corresponds to one machine cycle. Serial numbers "1" to "5" indicates the order of code words to be processed. At Step s1, the code analyzer 406 analyzes a cord word 1 among supplied codes. The analyzed result is latched by the analyzed result output latch 406-5, and the output ready signal 406-m, 407-c is outputted. At Step s2, the transition point address calculator 407 outputs the analyzed result input signal 406-n, 407-d to receive the analyzed result. The transition point address calculator 407 outputs the reference line memory address and control signal at Step s1 to receive the reference line image signal, and detects the transition point at Step s2. In accordance with the reference line transition point address and the code analyzed result, the transition point address calculator 407 calculates the decode line transition point address and outputs the output ready signals 407-p and 408c. At the same time, the code analyzer unit 406 receives the next code word "2" and decodes it. At Step s3, the image signal recovery unit 408 receives the decode line transition point addresses 407-g and 408-d to generate the decoded line image signal 408-j which is written in the decoded line memory. At the same time, the code analyzer 406 encodes the code word "3" and the transition point address calculator 407 calculates the decode line transition point address of the code word "2". In the same manner, the code analyzer 406, transition point address calculator 407, and image signal recovery unit 408 continue to execute the parallel pipeline process on the code word unit basis, by interchanging the ready signals 406-m, 407-c, 407-p, and 408-c and the input signals 406-n, 407-d, 407-q, and 408-d. In the decoding process for the code word "3", the transition point is not present on the reference line at "3-1" and "3-2" and present at "3-3", so that the transition point address calculator 407 will not supply the analyzed results of the next word "4" at Steps s5 and s6. Therefore, the code analyzer 406 remains latching the analyzed result of the next code word "4". Since the transition point is present on the reference line at "3-3" at Step s6, the transition point address calculator 407 completes its operation for the code word "3", and the analyzed result of the cord word "4" is supplied at Step s7. In this manner, even if the decoding process is not completed in one Step, the pipeline operation can be executed normally because the ready signals and input signals are interchanged between respective blocks. Even if a transition point is not detected at a certain Step, the transition point address calculator 407 assumes a virtual transition point address at the location after the address of the reference line memory in concern, and calculates a virtual decode line transition point address by using the virtual reference line transition point address, the virtual decode line transition point address being outputted to the image signal recovery unit 408. Therefore, the image signal recovery unit 408 can recover the image signal and store it in the line memory in accordance with the virtual decode line transition point address at Steps s5 and s6. For example, it is assumed that there is no transition point of the image signal with the word address "5" on the reference line and the virtual reference line transition point address is represented by the word address "6" and bit address "0". In this case, if the analyzed result is VR1 (indicating the transition point on the decode line is one pixel right from that on the reference line), the virtual decode line transition address can be represented by the word address "6" and bit address "0", and the image signal up to this address can be restored.

According to the embodiment of this invention, the operations of analyzing code words, calculating the transition point address of the decoded line, and recovering the image signal of the decoded line, can be processed in parallel in a pipelining manner for each code word. Furthermore, even if there is no transition point of the image signal on the reference line accessed at a certain Step, being unable to calculate the decode line transition point address, the image signal can be restored at a high speed in accordance with the virtual decode line transition point address.

Figures 9, 10:
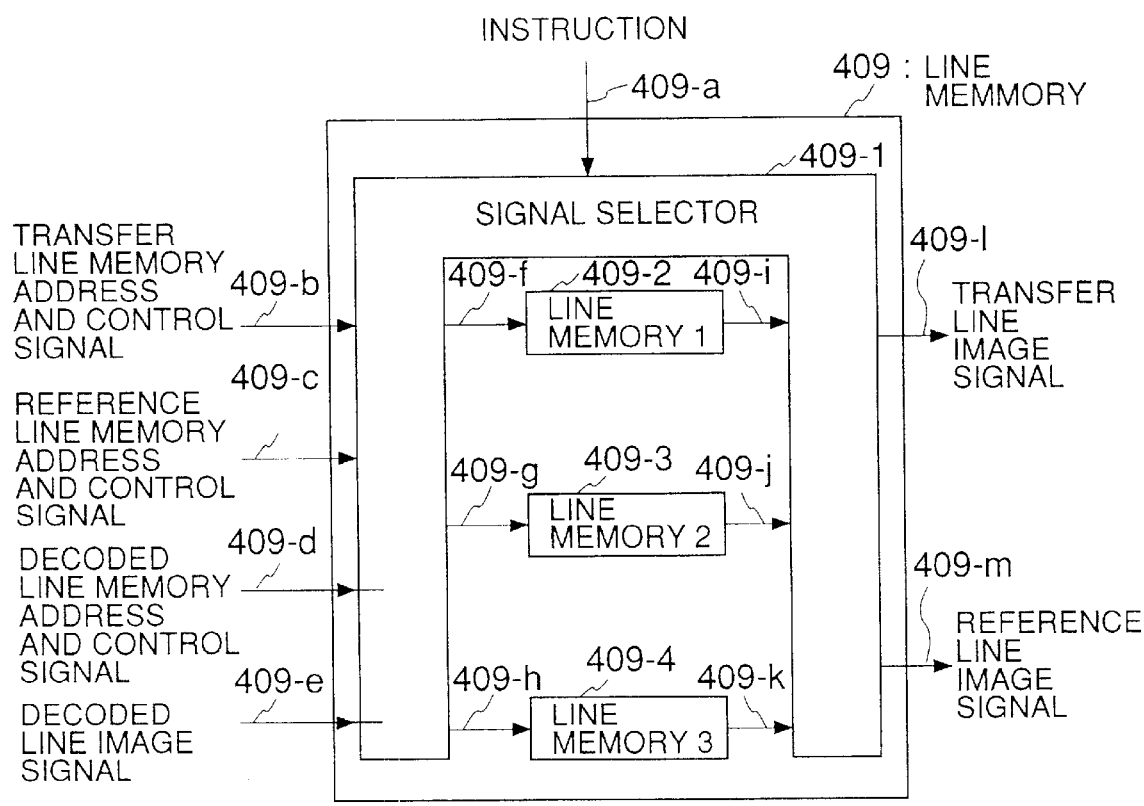
FIG. 9 is a circuit diagram in block showing the structure of line memories of the decoder.
FIG. 10 is a table explaining the functions of line memories.

FIG. 9 is a detailed block diagram of the line memory 409 according to the embodiment of the present invention.

In FIG. 9, reference numeral 409-1 represents a signal selector, reference numeral 409-2 represents a first line memory, reference numeral 409-3 represents a second line memory, and reference numeral 409-4 represents a third line memory. Reference numerals 409-a to 409-m represent signals at circuit portions of the line memory 409. The signal selector 409-1 manages the line pointer shown in FIG. 10 to determine the roles of the first to third line memories. The contents of the line pointer are updated from "0", "1", "2", and "0" in this order in response to the operation instruction 409-a from the control sequencer 401. For example, if the line pointer indicates "0", the transfer line memory address and control signal 409-b is used as the input signal 409-f of the first line memory 409-2, a reference line memory address and control signal 409-c is used as the input signal 409-g of the second line memory 409-3, and the decoded line memory address and control signal 409-d and the decoded line image signal 409-e are used as the input signal 409-h of the third line memory 409-4. In addition, the output 409-i of the first line memory 409-2 is used as the transfer line image signal 409-1, and the output 409-j of the second line memory 409-3 is used as the reference line image signal 409-m. In this manner, the first line memory 409-2 is used for the transfer line, the second line memory 409-3 is used for the reference line, and the third line memory 409-4 is used for the decoded line.

Figure 11:
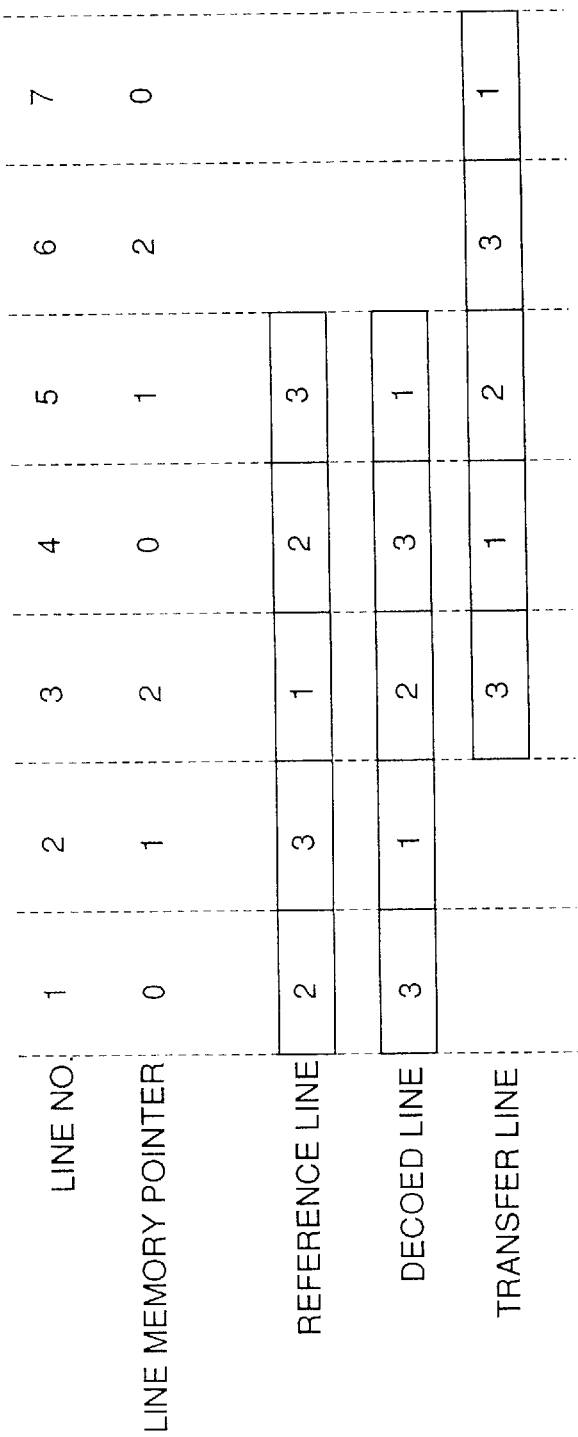
FIG. 11 is a sequence diagram illustrating a pipeline process on the line unit basis.

FIG. 11 is a timing chart illustrating a change in role of the three line memories. The ordinate represents a serial number of lines to be processed, line memory pointer, reference line, decoded line, and transfer line, respectively in this order from the top to bottom. The abscissa represents time in the direction from the serial number "1" to "7". In this example, one page is assumed to have seven lines from line No. 1 to line No. 7. For line No. 1, the line pointer is "0". In this case, the second line memory 409-3 is used for the reference line, and the third line memory 409-4 is used for the decoded line for the execution of decoding. For line No. 3, the first and second line memories are used for the reference line and decoded line. In this case, while the decoding operation is executed, the image signal stored in the third line memory 409-4 is transferred to the recording unit 200. In this manner, the decoding process and transfer process can be executed at a high speed in parallel in a pipelining manner on the line unit basis, because the decoder 400 is provided with three line memories and so the code analyzer 406, transition point address calculator 407, image signal recovery unit 408, and transfer unit 410, can operate separately.

Figure 12:
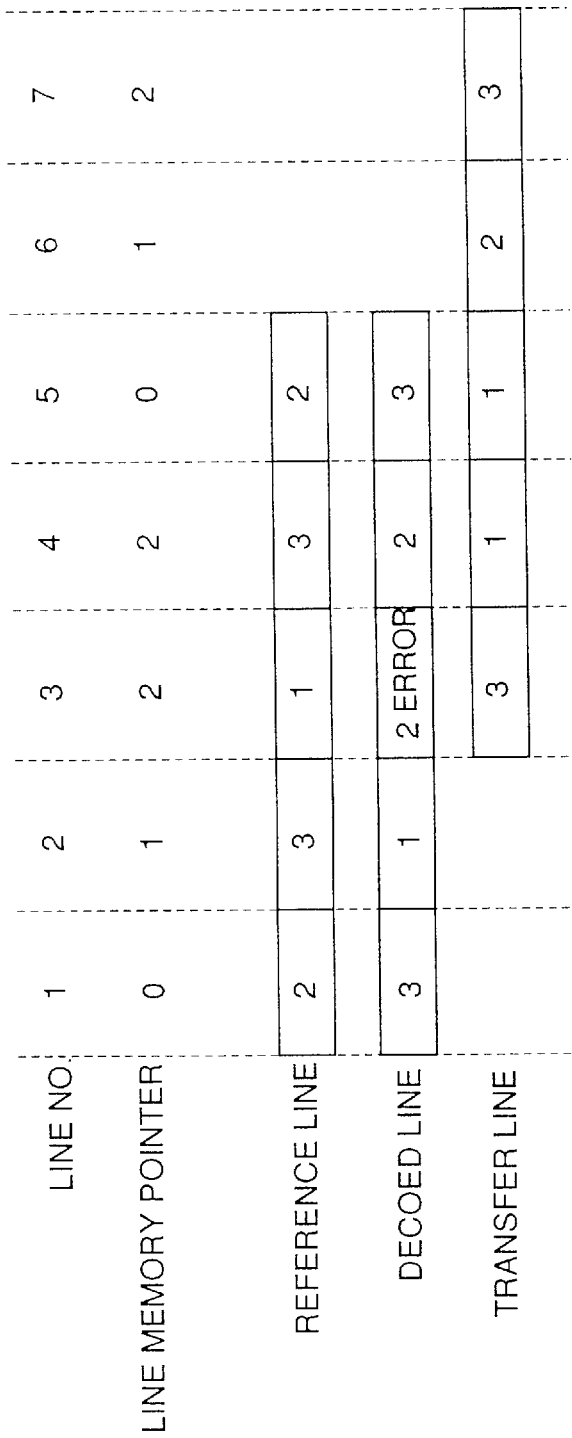
FIG. 12 is a sequence diagram illustrating a pipeline process on the line unit basis when an error occurs.

FIG. 12 is a timing chart illustrating a change in role of the three line memories when a decoding error occurs at line No. 3. The decoder 400 has a function to judge an error when the number of decoded pixels of one line is different from a predetermined number, or a function to judge an error after the line is decoded to an unusual code. When a decoding error occurs, the control sequencer 401 issues the operation instruction 409-a to the line memory 409 to inform an occurrence of the decoding error, before the next line is processed. Upon reception of this error notice, the signal selector 409-1 does not renew the line pointer and exchange the reference line with the transfer line, to thereafter process the next line. Specifically, as shown in FIG. 12, when line No. 4 is processed, the reference line and transfer line for the line pointer "2" are exchanged to use the third line memory 409-4 as the reference line and the first line memory 409-2 as the transfer line. At the timing of processing line No. 5, the line pointer is changed from "2" to "0" and the exchange between the reference line and transfer line is released. Therefore, the image signal of line No. 3 having a decoding error will not be transferred at the timing of processing line No. 5, but the image signal having no decoding error stored in the first line memory 409-2 can be transferred again. The embodiment line replacement method allows to transfer the image signal having no decoding error at the line before the error line, only by stopping the renewal of the line pointer and exchanging the reference line and transfer line. In contrast, according to the conventional line replacement method, the image signal having no decoding error at the line before the error line is copied to the line memory which stores the image signal having a decoding error. As a result, in this embodiment, the time required for copying is not necessary, resulting in a high speed line replacement at the occurrence of a decoding error.

Figure 13:
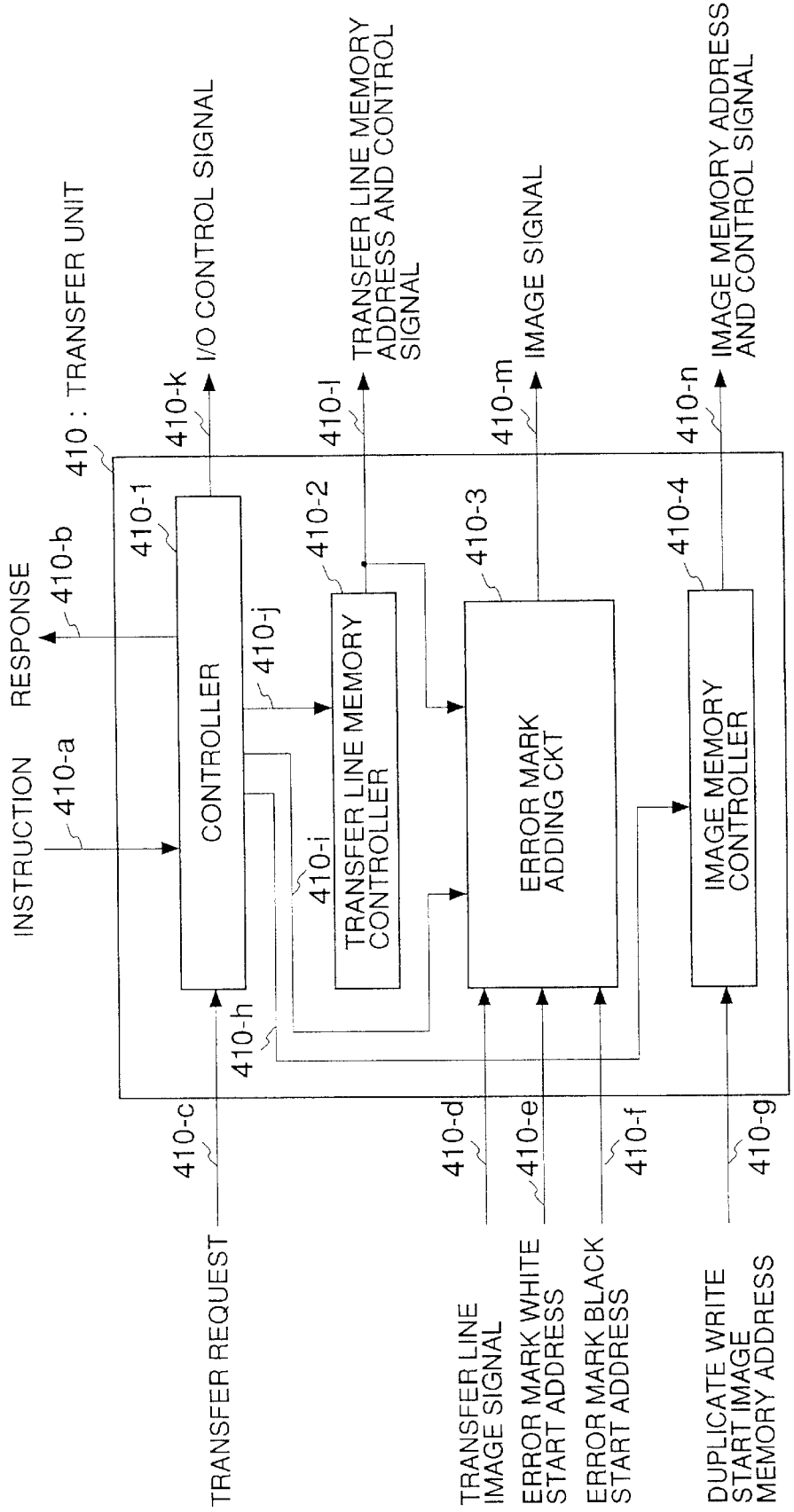
FIG. 13 is a circuit diagram in block showing the structure of a transfer unit of the decoder.

FIG. 13 is a detailed functional block diagram of the transfer unit 410.

In FIG. 13, reference numeral 410-1 represents a controller, reference numeral 410-2 represents a transfer line memory controller, reference numeral 410-3 represents an error mark adding circuit, and reference numeral 410-4 represents an image memory controller. Reference numerals 410-a to 410-n represent signals at circuit portions of the transfer unit. The controller 410-1 controls each functional block of the transfer unit 410 in response to the operation instruction signal 410-a from the control sequencer 401. The operation instruction signal 410-a from the control sequencer 401 includes a transfer instruction signal for transferring the contents of the transfer line memory to the recording unit 200, a transfer instruction signal for transferring the contents of the transfer line memory to the image memory 1000, a transfer instruction signal for transferring the contents of the transfer memory to both the recording unit 200 and image memory, and a transfer instruction signal for transferring the contents of the image memory 1000 to the recording unit 200, respectively in accordance with the contents of the register group 402. The operation instruction signal 410-a from the control sequencer 401 is provided with an error mark addition instruction in accordance with the contents of the register group 402 and the information of whether data transfer is for the error line or not. If the signal 410-a is the transfer instruction signal for transferring the contents of the transfer line memory to the recording unit, the controller 410-1 outputs an access instruction signal 410-j to the transfer line memory controller 410-2 in response to a transfer request signal 410-c from the recording unit 200, and synchronously with outputting the signal 410-c it outputs an I/O control signal 410-k to the recording unit 200 to transfer an image signal 410-m stored in the transfer line memory to the recording unit 200. In response to the access instruction signal 410-j, the transfer line memory controller 410-2 outputs the transfer line memory address and control signal 410-1 to access the transfer line memory. A transfer line image signal 410-d accessed by the transfer line memory controller 410-2 is outputted as an image signal 410-m. In this case, if the error mark addition instruction is present, the image signal is added with an error mark. In the case of the transfer instruction signal for transferring the contents of the transfer line memory to the image memory 1000, the controller 410-1 outputs the access instruction signal 410-j to the transfer line memory controller 410-2 and an image write instruction signal 410-h to the image memory controller 410-4, to write the image signal 410-m to the image memory 1000. In response to the image memory write instruction signal 410-h, the image memory controller 410-4 outputs an image memory address and control signal 410-n, to write the image signal 410-m to the image memory 1000. In response to the image memory write instruction signal 410-h, the image memory controller 410-4 outputs the image memory address and control signal 410-n, and writes the image signal 410-m to the image memory 1000. The address of the image memory 1000 is incremented by "1" each time the image signal 410-m of one word is written in the image memory 1000 after the image memory address 410-g is set to a duplicate record image memory start address register of the register group 402 at the page top. In the case of the instruction of transferring the contents of the transfer line memory to both the recording unit 200 and the image memory 1000, in response to the transfer request 410-h from the recording unit 200, the controller 410-1 outputs both the access instruction signal 410-j and image memory write instruction signal 410-h to execute at the same time the operation of writing the image signal 410-m to the image memory 1000 and transferring it to the recording unit 200. In the case of the instruction of transferring the contents of the image memory 1000 to the recording unit 200, in response to the transfer request 410-c from the recording unit 200, the controller 410-1 outputs the image memory read instruction signal 410-h, and synchronously with this, transfers the image signal stored in the image memory 1000 to the recording unit 200. Upon reception of the error mark addition instruction signal 410-j, the error mark adding circuit 410-3 forcibly changes the transfer line image signal 410-d to white after the time when the transfer line memory address 410-1 coincides with the error mark white start address, and outputs the image signal 410-d as the image signal 410-m, and forcibly changes the transfer line image signal 410-d to black after the time when the transfer line memory address 410-1 coincides with the error mark black start address, and outputs the image signal 410-d as the image signal 410-m. In this manner, the error mark is added to the line having an error. The error mark white and black start addresses are indicated by the values set to the register group 402.

Figure 14:
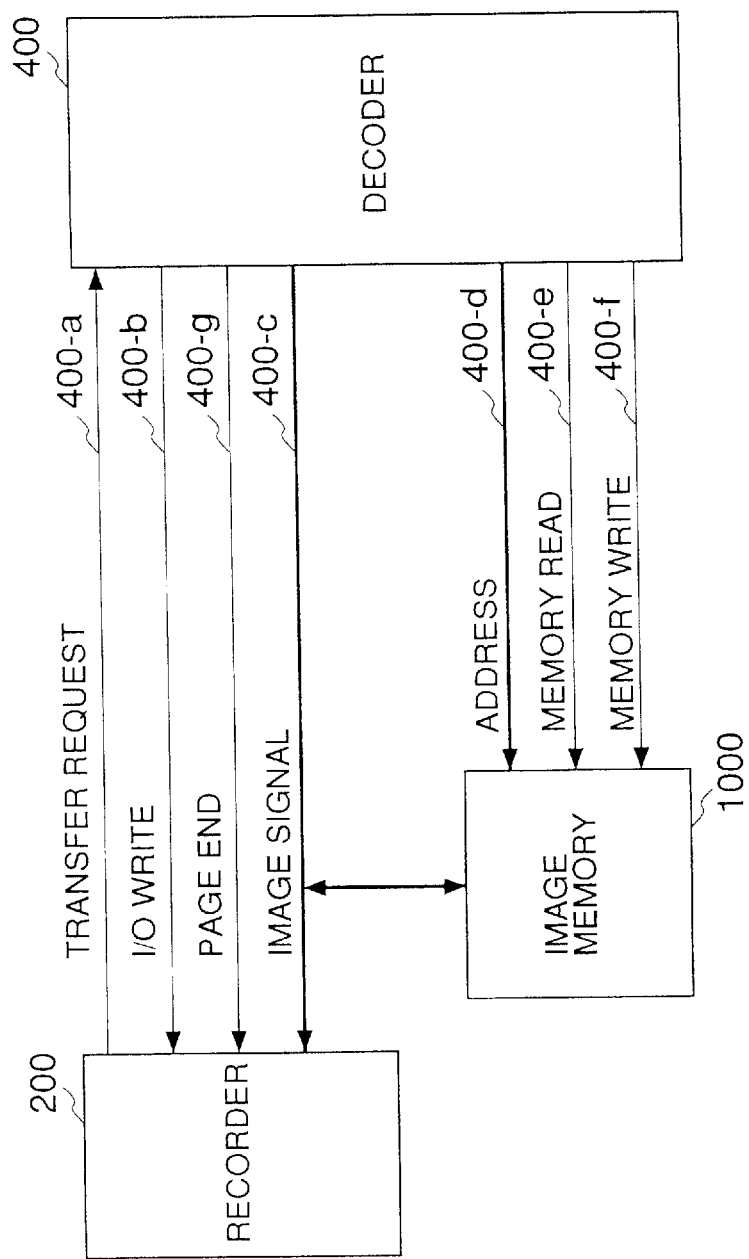
FIG. 14 shows an interconnection among the decoder, recording unit, and image memory.

FIG. 14 shows the details of signals to be transferred between the decoder 400 and recording unit 200 and image memory 1000, i.e., signals on the second image bus 2. Reference numerals 400-a to 400-g represent the signals. The transfer request signal 410-c, I/O control signal 410-k, and image signal 410-m correspond to signals 400-a, 400-b, and 400-c to be transferred between the recording unit 200 and decoder 400 via the image bus I/F 411. The image memory address and control signal 410-n corresponds to an address signal 400-d, a memory read signal 400-e, and a memory write signal 400-f to the transferred between the image memory 1000 and decoder 400 via the image bus I/F 411. The signal 400-g is a page end signal.

Figure 15:
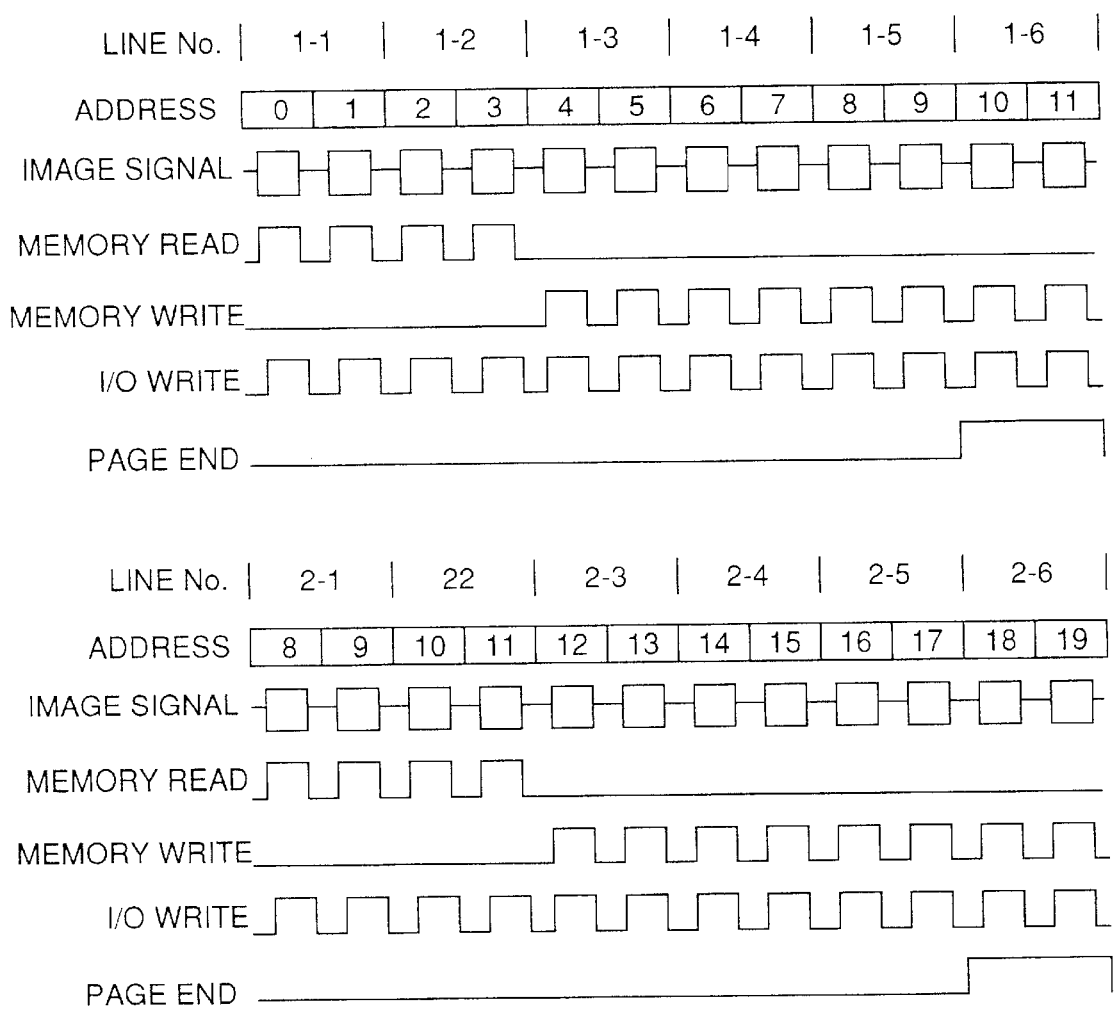
FIG. 15 is a diagram showing the timings of an image signal at the decoder.

FIG. 15 is a timing chart explaining the operation of outputting the image signal 400-c to the recording unit 200. In this example, one line is constituted by two words, and one page has six lines. Line No. 1-1 indicates the first line of the first page. The same representation is used up to line No. 2-6 which is the sixth line of the second page. The image signal 400-c of the first page generated by the decoder 400 is written to both the recording unit 200 and image memory 1000. Prior to the transfer of the image signal of the second page, the address of the image memory 1000 at the location two lines before, i.e., corresponding to the location "4" addresses before, is set to the register group, and the contents of the image memory 100 of two lines are transferred to the recording unit 200. The settings and meanings of the register group will be detailed later. With the above setting, the decoder 400 writes the image signal 400-c of the first two lines of the second page read from the image memory 1000 to the recording unit 200. Thereafter, the image signal 400-c generated by the decoder 400 is written. When the image signal at the last line of each page is transferred, the page end signal 400-g is outputted.

Figure 16:
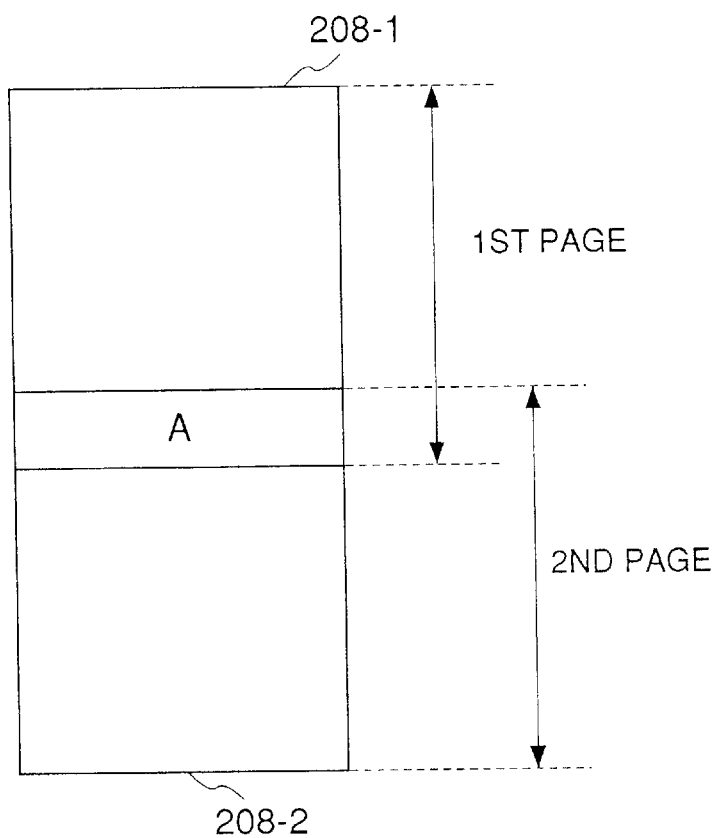
FIG. 16 is a diagram illustrating an example of duplicate record over two pages.

An example of a recorded copy 208 in the above operation is shown in FIG. 16. Reference numeral 208-1 represents the first page, and reference numeral 208-2 represents the second page. As shown, the same image of the last two lines of the first page can be recorded at the area of the first two lines of the second page. The decoder 400 is allowed to write the decoded image signal 400-c to both the image memory 1000 and recording unit 200, and to write the contents of the image memory 1000 to the recording unit 200 so that the same image can be recorded on two pages. For example, if a received image signal cannot be recorded on a single page, the image area split into two pages is recorded in duplicate on two pages, allowing an easy recognition of the split image area.

Figure 17:
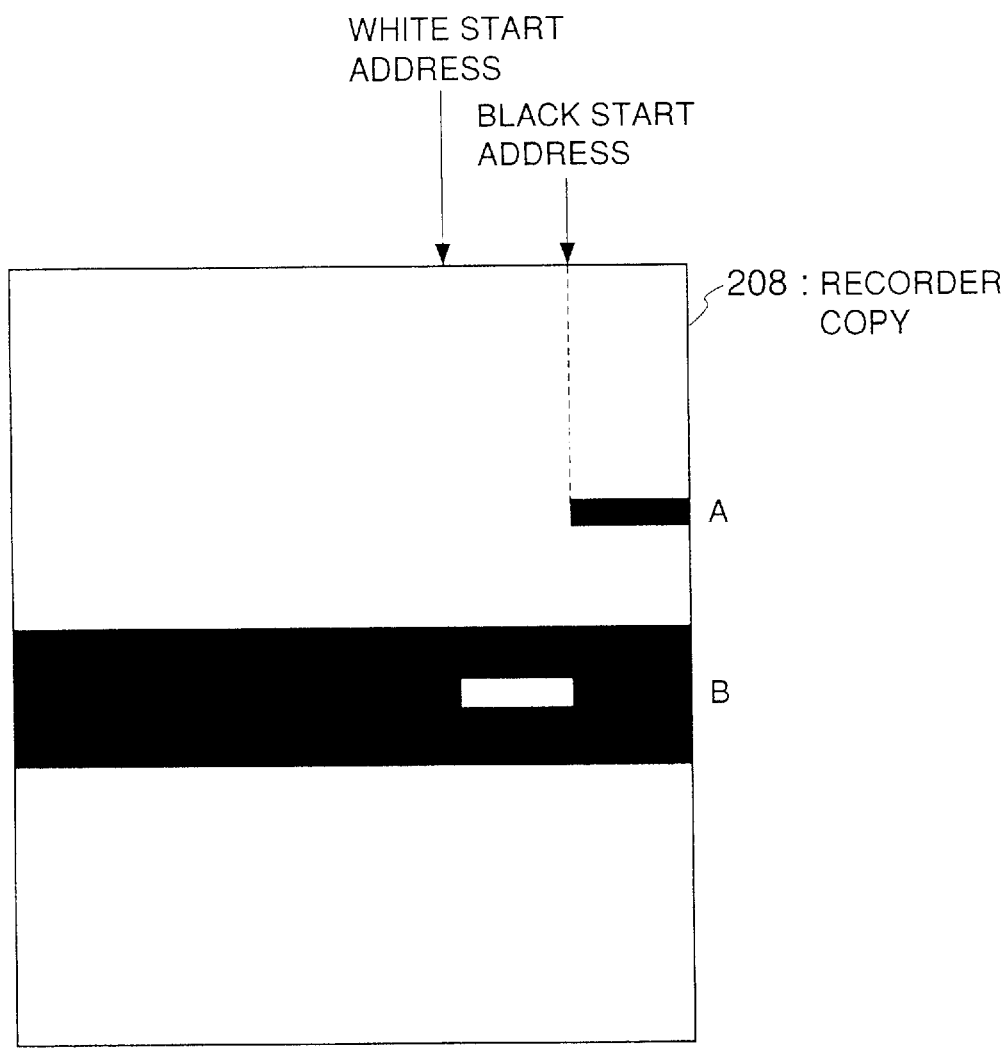
FIG. 17 is a diagram illustrating an example of recorded error marks.

Examples of an error mark are shown in FIG. 17. Error marks indicating an error are recorded at lines A and B. The error mark addition position can be identified by a white error mark start address or a black error mark start address. An error mark can be therefore recorded at any position of a record copy irrespective of the white line background (line A) or black line background (line B).

Figure 21:
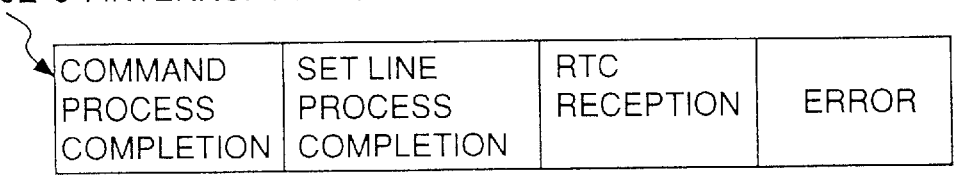
FIG. 21 is a detailed diagram of an interrupt request source register.
Figure 22:
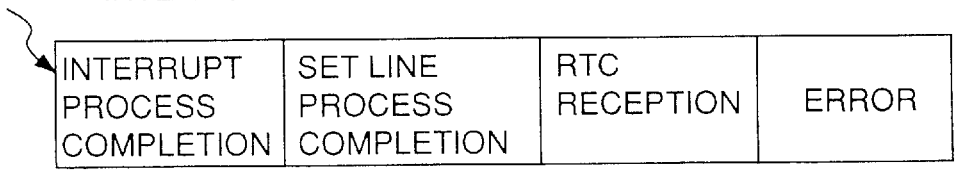
FIG. 22 is a detailed diagram of an interrupt request register.

FIG. 18 shows the details of the register group 402. The system controller 700 can access the register group 402 connected to the system bus 4 at any desired timing. Reference numeral 402-1 represents a software reset register. As the system controller 700 accesses this register, the decoder 400 is initialized. Reference numeral 402-2 represents a control register. With "1" being set to this register, the decoder 400 starts its operation, and with "0" being set, it intercepts the operation. Reference numeral 402-3 represents a static register. The state of the decoder 400 can be known from this register by the system controller 700. The status register is detailed in FIG. 19. It can be known from this register whether FIFO 405 is ready or not (FIFO RDY), whether there is an interrupt request (IRQ), and whether there is a decoding error (ERROR). Reference numeral 402-4 represents a configuration register by which the system controller can instruct the operation mode of the decoder 400. The configuration register is detailed in FIG. 20. The configuration register has a coding mode field for selecting one of MH, MR, and MMR coding schemes, an error mark enable field for determining whether an error mark is added, a page start field for determining whether the process starts from the top of a page or from the intermediate area of the page, an error interception field for determining whether the process is intercepted or continued upon occurrence of an error, an image memory transfer enable field for determining whether the image signal is written to the image memory 1000, an I/O transfer enable field for determining whether the image signal is written to the recording unit 200, a duplicate record instruction field for determining whether the image signal stored in the image memory 1000 is transferred to the recording unit 200 to record in duplicate a portion of the image signal on two consecutive pages, an infinite length line process field for determining whether the process is for an infinite length line, and a page end output enable field for determining whether a page end signal is outputted. When the infinite line process is indicated, the decoder 400 continues the decoding operation by neglecting the number of lines to be executed and set to a decoded line number register 402-11, until there occurs an event of decoding an RTC code, an event of an input of interception interrupt, or an event of an error occurrence and interception instruction. Therefore, if the recording unit 200 is of a thermal recording type and has a roll of recording paper, an original of a large amount of information can be continuously decoded and recorded on a plurality of pages by instructing the decoding/recording operation only once, lessening the load of the system controller 700. Since it is possible to determine whether the page end signal is outputted, an original of two pages for example can be recorded on a single page if the page end signal is not outputted for the first original page and outputted for the second page. Reference numeral 402-5 represents an interrupt request register to which an interrupt source is set when the decoder 400 issues an interrupt. The system controller 700 can know the source of an interrupt the decoder issued, by reading this register. The details of the register are shown in FIG. 21. The interrupt source includes a process interception interrupt indicating the interception of the process with "0" being set to the control register, a set line decoding completion interrupt indicating the completion of lines as many as the number set to a decoded line number register 402-11, an RTC reception interrupt indicating the completion of processing an RTC or E of B code, and an error interruption indicating the interception by an occurrence of a decoding error. Reference numeral 402-6 represents an interrupt mask register the details of which are shown in FIG. 22. The system controller 700 can mask an interrupt of each interrupt source shown in FIG. 21 by setting a mask bit to the interrupt mask register. For example, if the mode of not to intercept the operation upon occurrence of an error is set to the configuration register 402-4 and an error interrupt mask bit is set to the interrupt mask register 402-6, the system controller 700 can make the decoder 400 to continue the decoding process irrespective of an occurrence of a decoding error. Reference numeral 402-8 represents a code input register for writing codes from the system bus 4 to FIFO 405. Codes can be transferred from the system bus 4 to the decoder 400 if the system controller 700 confirms the ready state of FIFO 405 by reading the status register 402-3, and the system controller 700 sets a proper value to this register to enable to transfer codes from the system bus 4 to the decoder 400 without using the code bus 3. It is therefore easy to debug the decoder 400 at the start-up of the system. Reference numeral 402-9 represents an RTC register to which the system controller 700 sets the number of consecutive lines judged as RTC or E of B. Reference numeral 402-10 represents a line pixel number register to which the system controller 700 sets the number of pixels per line in the main scan direction. Reference numeral 402-11 represents a line number register to which the system controller 700 sets the number of lines to be consecutively processed. Reference numeral 402-12 represents a duplicate record line number register to which the system controller 700 sets the number of lines to be duplicated over two pages as described with FIG. 16. Reference numeral 402-13 represents a duplicate record image memory start address register to which the system controller 700 sets the address of the image memory 1000 where the start image signal to be transferred from the decoder 400 to the recording unit 200 is stored. Reference numeral 402-14 represents an image memory address register. The system controller 700 can know the address of the image memory 1000 where the decoder 400 is accessing, by reading this register. For the duplicate record of the last N lines of the first page to the second page, the registers are set as in the following. The system controller 700 instructs the decoder 400 to start the decoding operation for the first page by enabling the decoded image signal to be transferred to both the recording unit 200 and the image memory 1000. At the timing when the first page is completely decoded, the system controller 700 reads the image memory address register 402-14 to know an address A where the last decoded data is stored. Prior to starting the decoding operation for the second page, a value obtained by subtracting the number of pixels per line * N from A is set to the duplicate record start address register 402-13. Next, the duplicate record instruction and the intermediate page decoding instruction are set to the configuration register 402-4, and thereafter the control register 402-2 is set with "1" to start the decoding operation. The decoder 400 transfers to the recording unit 200 the image signal of N lines stored in the image memory 1000 starting from the address set in the duplicate record image memory start address register 402-13, and thereafter a newly decoded image signal is transferred to the recording unit 200. In this manner, the decoder 400 can transfer the decoded image signal to both the recording unit 200 and image memory 1000, and can transfer the image signal stored in the image memory 1000 at an optional address set to the register 402-13 which can be known by the system controller 700. Accordingly, if an original of one page is to be recorded on two or more pages, an image portion of a desired number of lines can be recorded in duplicate at the bottom of a first page and top of a second page areas of split pages, providing an easy recognition of the split image area. Reference numerals 402-15 and 402-16 represent a black error mark start address register and a white error mark start address register, to which registers the positions of error marks on a record copy are set. Reference numeral 402-17 represents a total line number count register to which the decoder sets the total number of decoded lines as counted from the top line of a page. The system controller 700 can know from this register the total number of lines of a page decoded by the decoder 400.

Figure 23:
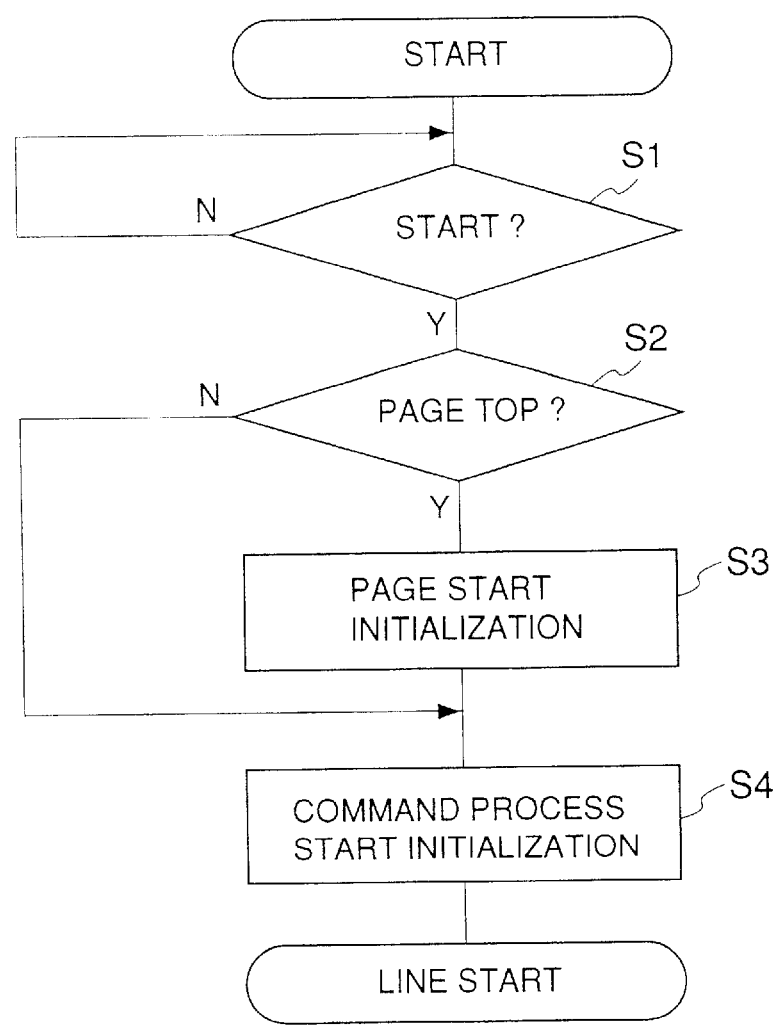
FIG. 23 is a flow chart explaining the operation of the decoder.
Figure 24:
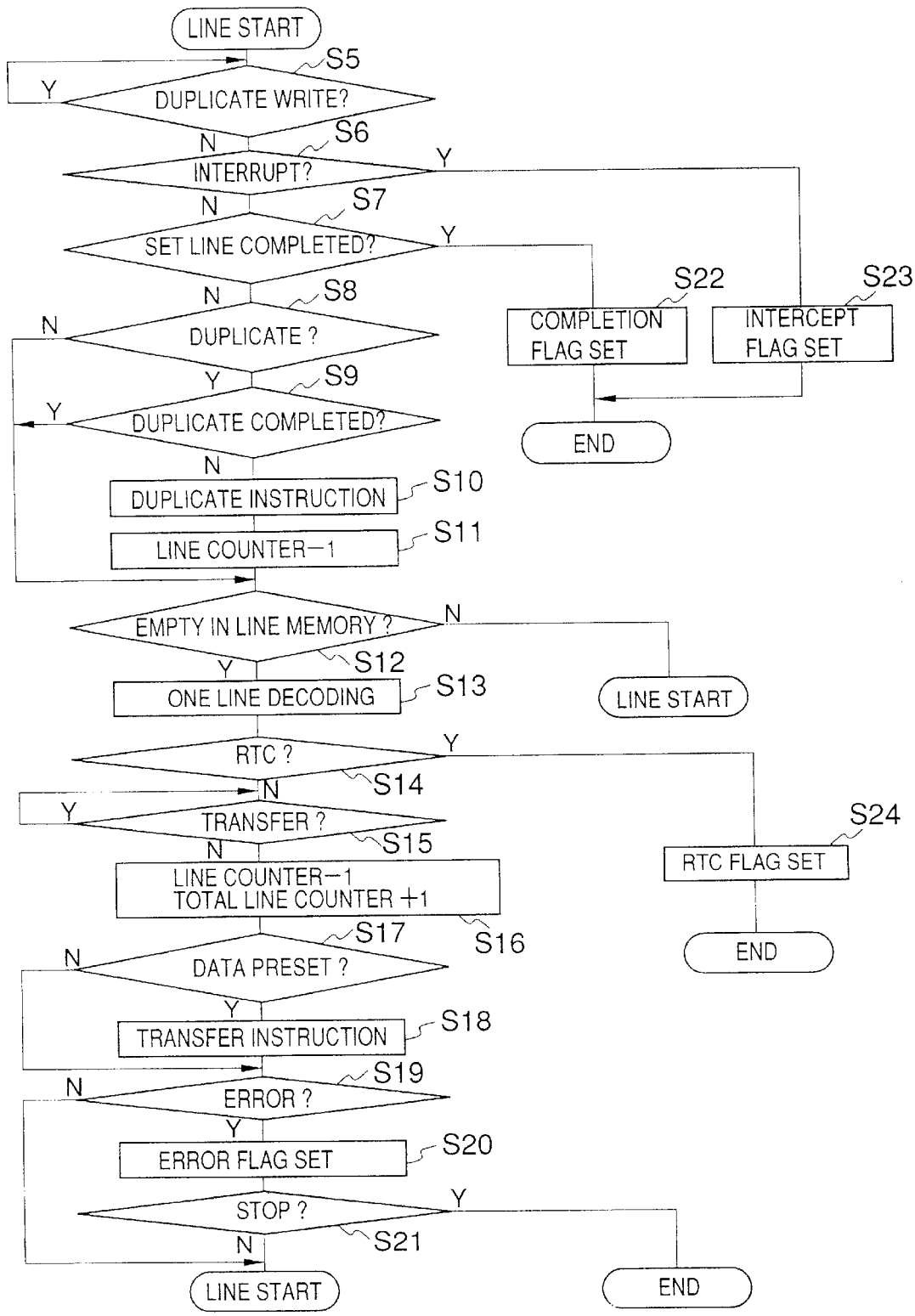
FIG. 24 is a flow chart explaining the operation of the decoder.
Figure 25:
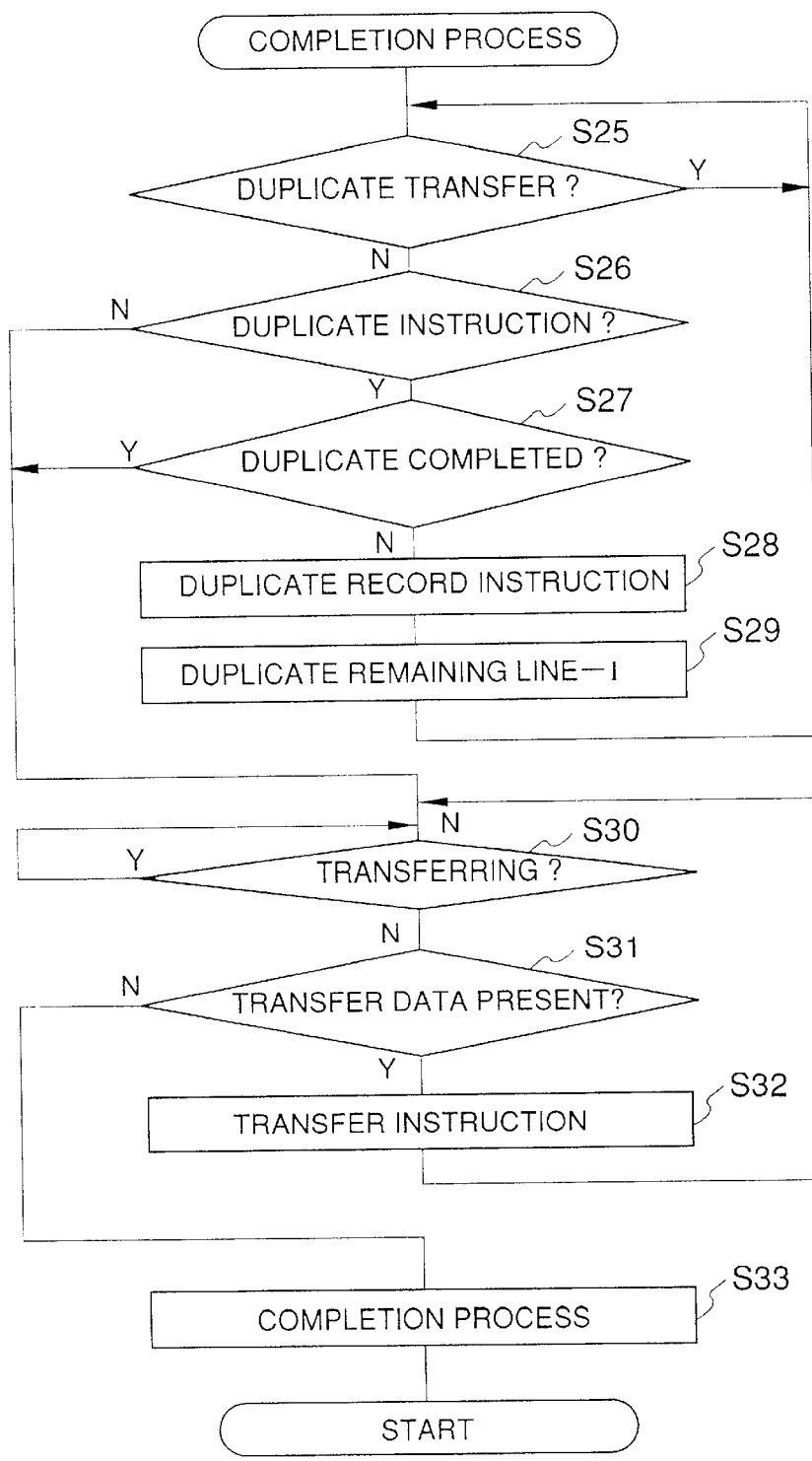
FIG. 25 is a flow chart explaining the operation of the decoder.

FIGS. 23 to 25 are flow charts explaining the operation of the decoder 400 to be performed by the control sequencer 401. The operation begins with Step 1. It is checked at Step 1 whether "1" is being set to the control register 402-1. If set, the decoding process starts at Step 2, and if not, the flow returns to Step 1 to hold an idling state. It is checked at Step 2 from the configuration register 402-4 (FIG. 20) whether the process is to be started from the top of a page. If from the top of a page, the flow advances to Step 3, and if not, the flow jumps to Step 4. At Step 3, the decoder 400 is initialized for the page top start. For example, the total line number count register 402-1 (FIG. 18) and FIFO 405 are reset. At Step 4, the decoder 400 is further initialized for the decoding process. For example, the interrupt request register 402-5 (FIG. 21) is reset and the contents of the duplicate record start address register 402-13 (FIG. 18) is set to the image memory controller 410-4 (FIG. 13) of the transfer unit 410. Next at Step 5 shown in FIG. 24 it is checked whether the image signal stored in the image memory 1000 is being transferred to the recording unit 200 for the duplicate record. If being transferred, the flow stands by until the duplicate record is completed, and if not the flow advances to Step 6 whereat it is checked whether "0" is being set to the control register 402-2 (FIG. 18) to instruct the process interception. In the case of the process interception, the flow advances to Step 23 whereat an interception interrupt is set to the interrupt request source register 402-5 (FIG. 18) and the flow transits to the completion process from Step 25. Step 6 is executed once for each line so that the system controller 700 may intercept the decoding process at any desired line. If the process interception is not instructed, it is checked at Step 7 whether the decoding process for the number of lines set to the line number register 402-11 (FIG. 18) has been completed. If completed, at Step 22 a set line decoding completion is set to the interrupt request source register 402-5 (FIG. 18) and the flow transits to the completion process from Step 25. If not completed at Step 7, the flow advances to Step 8 to check whether a duplicate record is being set to the configuration register 402-4 (FIG. 18). If being set, the flow advances to Step 9, and if not, the flow jumps to Step 12. It is checked at Step 9 whether the duplicate record of as many lines as set to the duplicate record line number register 402-12 (FIG. 18) has been completed. If completed, the flow jumps to Step 12, and if not, the flow advances to Step 10. At Step 10, a duplicate record transfer of one line is instructed to the transfer unit 410. At Step 11, the duplicate record line number is decremented by "1" to follow Step 12. At Step 12 it is checked whether the line memory 409 (FIG. 9) has an empty space sufficient for storing the decoded image signal of one line. If there is an empty space, the flow advances to Step 13, and if not, the flow returns to Step 5 to repeat the above operation. At Step 13, the decoding process for one line is executed. Namely, the decoding process is instructed to the code analyzer 406, transition point address calculator 407, and image signal recovery unit 408. The decoding process is disclosed in detail, for example, in JP-A-59-126368, and so the description thereof is omitted in this specification. As described above, the decoding process is performed even during the duplicate record if there is an empty space of the line memory 409. Accordingly, the image signal in the line memory 409 can be transferred to the recording unit 200 immediately after the completion of the duplicate record, providing a real time duplicate record without using a page memory. After the completion of the decoding process for one line, the flow advances to Step 14 whereat it is checked whether an RTC or E of B code representing the last code of a page has been decoded. If decoded, the flow advances to Step 24, and if not, the flow advances to Step 15. At Step 24, the decoding of an RTC or E of B code is set to the interrupt request source register 402-9 (FIG. 18) and the flow transits to the completion process starting from Step 25. It is checked at Step 15 whether the image signal is being transferred to the recording unit 200. If being transferred, the flow stands by until the transfer is completed, and if not, the flow advances to Step 16 whereat the remaining line number is decremented by "1", and the total line number count register 402-1 (FIG. 18) is incremented by "1".

If the remaining line number is "0" and the infinite length line process is not being instructed, the set line process completion flag is set. At Step 17, it is checked whether the transfer line memory 409 (FIG. 9) has an image signal. If there is an image signal, it is transferred to the transfer unit 410 to follow Step 19 whereat it is checked whether the decoded line has an error. If there is an error, the flow advances to Step 20, and it not, the flow returns to Step 5. At Step 20, an error interrupt request is set to the interrupt request source register 402-5 (FIG. 18) to follow Step 21 whereat it is checked whether an error interception interrupt is being set to the configuration register 402-4 (FIG. 20). If being set, the flow transits to the completion process starting from Step 25 shown in FIG. 25, and if not, the flow returns to Step 5 to repeat the above operation for each line. The completion process begins with Step 25. At Step 25, it is checked whether the image signal is being transferred for the duplicate record. If being transferred, the flow stands by until the transfer is completed, and if not, the flow advances to Step 26 whereat it is checked whether a duplicate record transfer is being set to the configuration register 402-4. If being set, the flow advances to Step 27, and if not, the flow jumps to Step 30. It is checked at Step 27 whether the duplicate record transfer of as many lines as set to the duplicate record line number register 402-12 has been completed (FIG. 18). If not completed, the flow advances to Step 28, and if completed, the flow jumps to Step 30. At Step 28, the duplicate record transfer of one line is instructed to the transfer unit 410. At Step 29, the remaining duplicate record line number is decremented by "1" to return to Step 25 and repeat the operation from Step 25 to Step 29 until the duplicate record transfer of set lines has been completed. It is checked at Step 30 whether the image signal in the line memory 409 (FIG. 9) is being transferred. If being transferred, the flow stands by until the transfer is completed, and if not, the flow advances to Step 31 whereat it is checked whether there is a line having its image signal in the line memory 409. If there is a line, the flow advances to Step 32, and if not, the flow jumps to Step 33. At Step 32, a transfer instruction is issued to the transfer unit to return to Step 30 and repeat the above operation from Step 30 to Step 32 until all the image signals stored in the line memory 409 have been transferred. When there is no line having its image signal in the line memory 409, Step 33 is executed to return to Step 1. The operation to be executed at Step 33 includes outputting a page end signal to the recording unit, resetting the control register 402-2 (FIG. 18), issuing a completion interrupt to the system controller 700, and the like.

As described above, the decoding process for the start to last lines of a page can be executed by the decoder 400 only if the system controller 700 sets necessary parameters to the register group 402 once at the start line of the page, reducing a load of the system controller 700. Whether Step 3 of the page start initialization is to be skipped can be determined from the contents of the parameters set to the register group 402, allowing the decoding process to resume at the intermediate position of one page, and allowing an original of one page to be recorded on two or more pages without using a bit map page memory. Since the completion interrupt is issued to the system controller after all the decoded image signals have been transferred to the recording unit 200, the system controller 700 can easily control the timing of the next operation of, for example, the recording unit 200.

Figure 26:
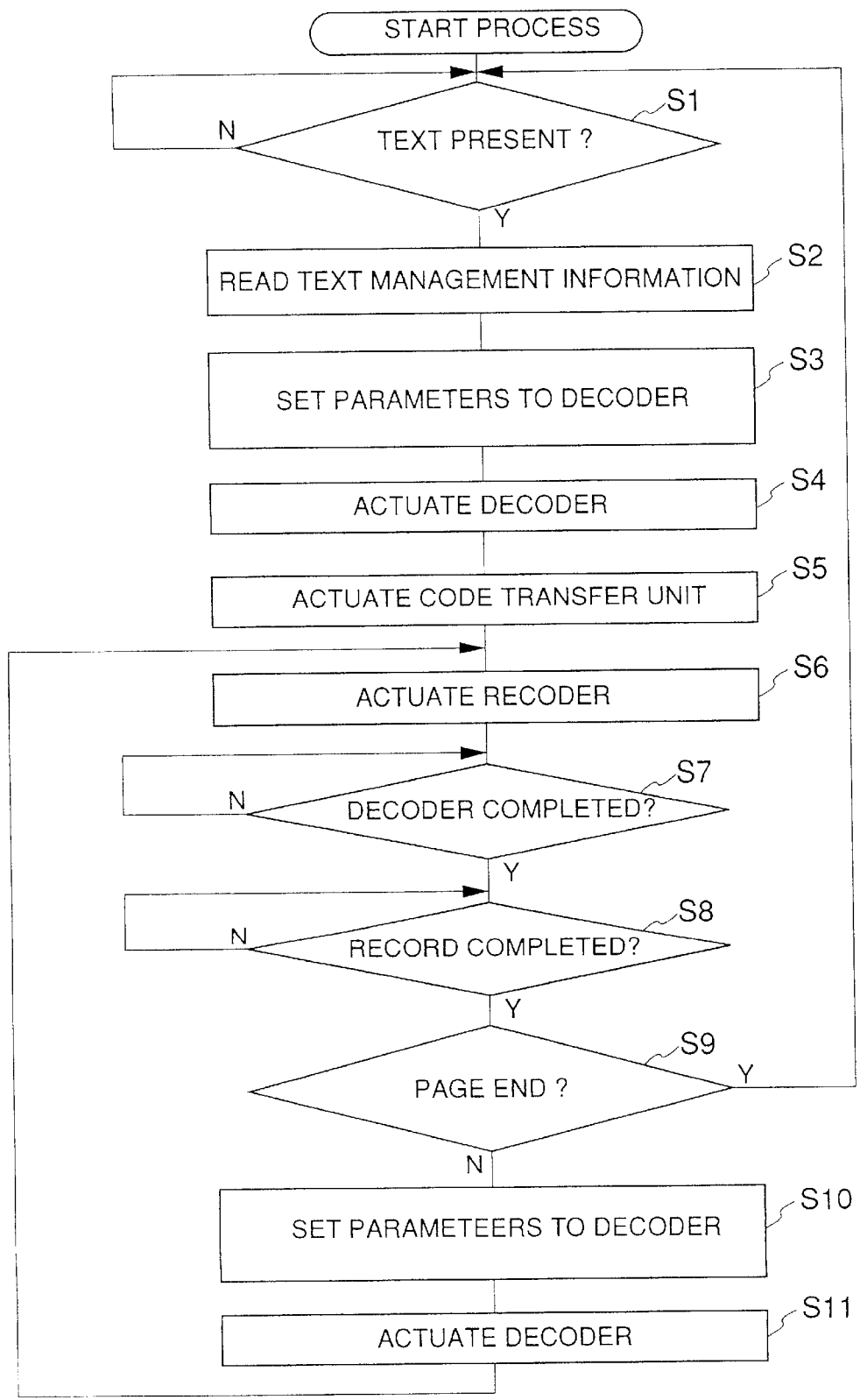
FIG. 26 is a flow chart explaining the operation of the system controller.

FIG. 26 is a flow chart explaining the operation of the system controller 700 when recording an original stored in the code memory 500. At Step 1, the text management information storage unit 900 is accessed to check whether the code memory 500 has codes of an original to be recorded. If there are codes, the management information of the codes are read from the text management information storage unit 900. The management information includes a coding scheme, a resolution of an original, an original width, a storage address, a code amount, and the like. In accordance with the management information, parameters such as the coding scheme are set to the register group 402 of the decoder 400 at Step 3. In this case, the number of lines to be processed is set so as to be within the length of a recording paper, and the process interception is set to the register group so as to intercept the process when all codes of the lines have been decoded. The page top start is also enabled. Next, at Step 4, "1" is set to the control register 402-2 (FIG. 18) of the decoder 400 to start it. At Step 5, the transfer start address, transfer word number, and the like are set to the transfer unit 800 to start transferring codes. With the above operation, codes stored in the code memory 500 are transferred to the decoder 400 to thereafter start the decoding process. At Step 6, the recording unit 200 is activated. With this operation, the image signal decoded by the decoder 400 is transferred to the recording unit 200 and recorded. It is checked at Step 7 whether a decoding completion interrupt has been issued from the decoder 400. If issued, the flow advances to Step 8 whereat it is checked whether the operation at the recording unit 200 has been completed. If completed, the flow advances to Step 9 whereat the register 402-5 (FIG. 18) of the decoder 400 is accessed to check the interrupt source. In the case of a decoding completion interrupt caused by the RTC decoding, it can be judged that the codes of one page have been recorded. Therefore, the flow returns to Step 1 to repeat the above operation until all the originals have been processed. In the case of a decoding completion interrupt caused by the completion of processing set lines, it can be judged that the image signal corresponding to one recording paper has been decoded and recorded to one page. Therefore, the flow advances to Step 10 whereat parameters are set to the register group 402 of the decoder 400, the parameters including a page intermediate start instruction, a duplicate record instruction, a duplicate record line number, a duplicate record image memory start address, and the like. At Step 11, the decoder 400 is activated to return to Step 6 to record the image signal to the next split page.

As described above, the decoder 400 automatically outputs the page end signal to the recording unit 200 so that the system controller 700 can easily control the timing of the completion of recording. The decoder 400 can intercept the decoding process when the codes of set lines have been decoded and can resume the decoding process from the code next to the interception, allowing an original of one page to be recorded to two or more pages without using a bit map page memory. Since the decoded image signal can be transferred to the recording unit 200 followed by the transfer of the image signal stored in the image memory 1000 to the recording unit 200, it is possible to realize a duplicate record over split pages without using a bit map page memory.

Whether the page top start or page intermediate start can be selected by the setting of the register group 402 of the decoder 400, an original of one page can be recorded to two or more pages without using a page memory.

Since the decoder 400 sets the number of decoded lines counted from the start line of one page to the register group 402 connected to the system bus 4, the system controller 700 can know the number of lines of an original and judge whether the original is to be recorded to a split page.

The decoder 400 transfers the decoded signal to both the recording unit 200 and image memory 1000, and after transferring the image signal stored in the image memory 1000 to the recording unit 200, it transfers a newly decoded image signal to the recording unit 200, realizing a duplicate record over split pages without using a page memory.

The decoder 400 can transfer the decoded image signal with an error mark to the recording unit 200, without using a page memory.

At the process completion, the decoder 400 issues a process completion interrupt with interrupt source information to the system controller 700. Therefore, the system controller can discriminate between the completion of one page original as noticed by decoding an RTC code and the presence of codes to be recorded to the next page as noticed by the completion of processing set lines, making easy to control the system.

At the process completion, the decoder 400 outputs a page end signal to the recording unit 200 which responds to this signal and terminates one page recording. Therefore, the system controller 700 can easily control the timing of the recording unit 200.

The decoder 400 is connected to three independent busses including the image bus 2, code bus 3, and system bus 4 and can receive signals from both the system bus 4 and code bus 3, realizing both the high speed operation and easy debugging.

The decoder 400 activates in parallel in a pipelining manner the code analyzer 406 capable of analyzing a code during one machine cycle, the transition point address calculator 407 capable of calculating a transition point address during one machine cycle at the minimum, and the image signal recovery unit 408 capable of recovering an image signal during one machine cycle at the minimum. As a result, one code can be decoded at a high speed during one machine cycle at the minimum.

Figure 27:
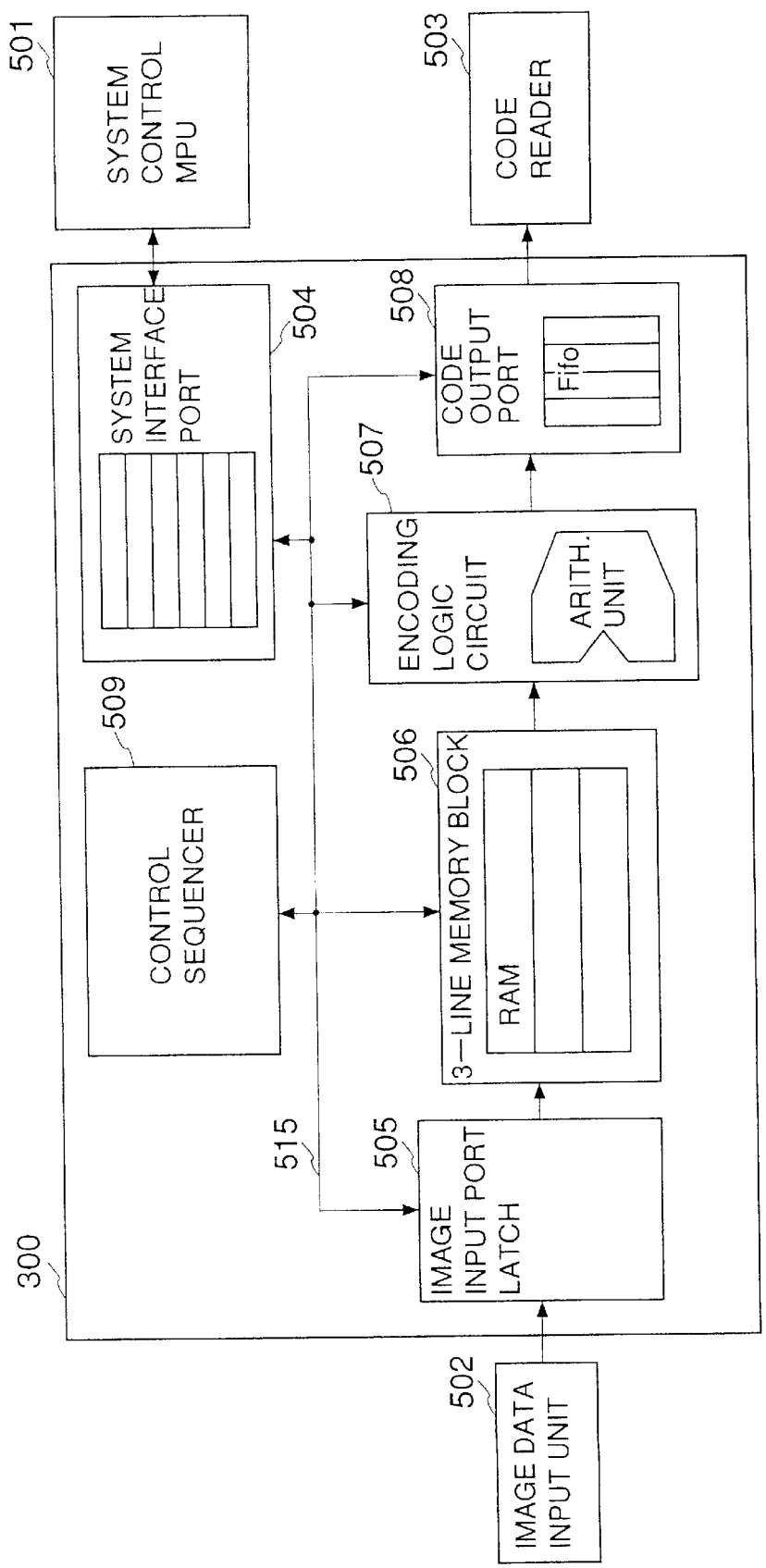
FIG. 27 is a block diagram showing the structure of the encoder.

Next, an example of the encoder 300 shown in FIG. 27 will be described in detail. A system controller (MPU) 501, an image data input unit 502, and a code reader 503 are connected to the encoder 300. FIG. 27 is a schematic diagram showing the encoder 300 made of a one-chip LSI. When the system controller 501 enters an encoding start instruction via a system interface port 504, an input of image data from the image data input unit 300 via an image input port 505 starts. The inputted image data is temporarily stored in a line memory of an image data input block among three line memory blocks 506. In this embodiment, three line memories are used. If three or more line memories are used, one line memory is used for an encode line, one line memory is used for a reference line, and the remaining line memories are used for image data storage lines. The image data stored in the line memory is then encoded by an encoding and logic circuit 507 and outputted from a code output port 508 to a code reader 503.

This series of operations is automatically executed one line after another by the encoder 300 under control of a control signal supplied via a control bus 515 from a control sequencer 509, after MPU 501 instructs the encoding operation once. In the three line memory blocks 506, each line memory is sequentially used as an image data input line memory, an encode line memory, and a reference line memory by a block sequencer (not shown). The control sequencer 509 sequentially assigns the line with the stored image data as the next encode line, the line with the encoded image data as the next reference line, and the reference line to the next image data input line, to execute the encoding process one line after another.

In response to a one line encode instruction from the control sequencer 509, the encoding and logic circuit 507 reads in parallel a predetermined number of bits of the image data from the three line memory blocks, and encodes them. The codes are then transferred to the code output port 508 in real time, and outputted to the code reader 503 in response to a request signal. When the one line encoding is completed, the encoding and logic circuit 507 outputs a one line encode completion signal to the control sequencer 509. If an encode continuation instruction is returned, the next line image data is encoded, and if an interception instruction is returned, a completion process is executed to thereafter output a completion signal to the control sequencer 509. This series of encoding operations can be automatically executed solely by the encoder 300 under control of the control sequencer 509 once data necessary for the encoding operation is set via the system interface port 504. It is therefore unnecessary for MPU 501 to operate during the encoding process. The encoding process interception interrupt is effected when an encode interception instruction is supplied from the system interface port 504, when the encoding of set lines is completed, or when an end-of-page signal is supplied from the image data input port 505. This interrupt can be effected on the line unit basis. Namely, the encoding will not be interrupted at the intermediate position of a line. The control sequencer 509 outputs the interrupt signal with an interrupt source to MPU 501 via the system interface port 504. However, the hardware reset intercepts the operation of the encoder 300 even at the intermediate position of a line, and the interrupt signal with an interrupt source will not be supplied to MPU 501.

The details of each element will be described below.

Figure 28:
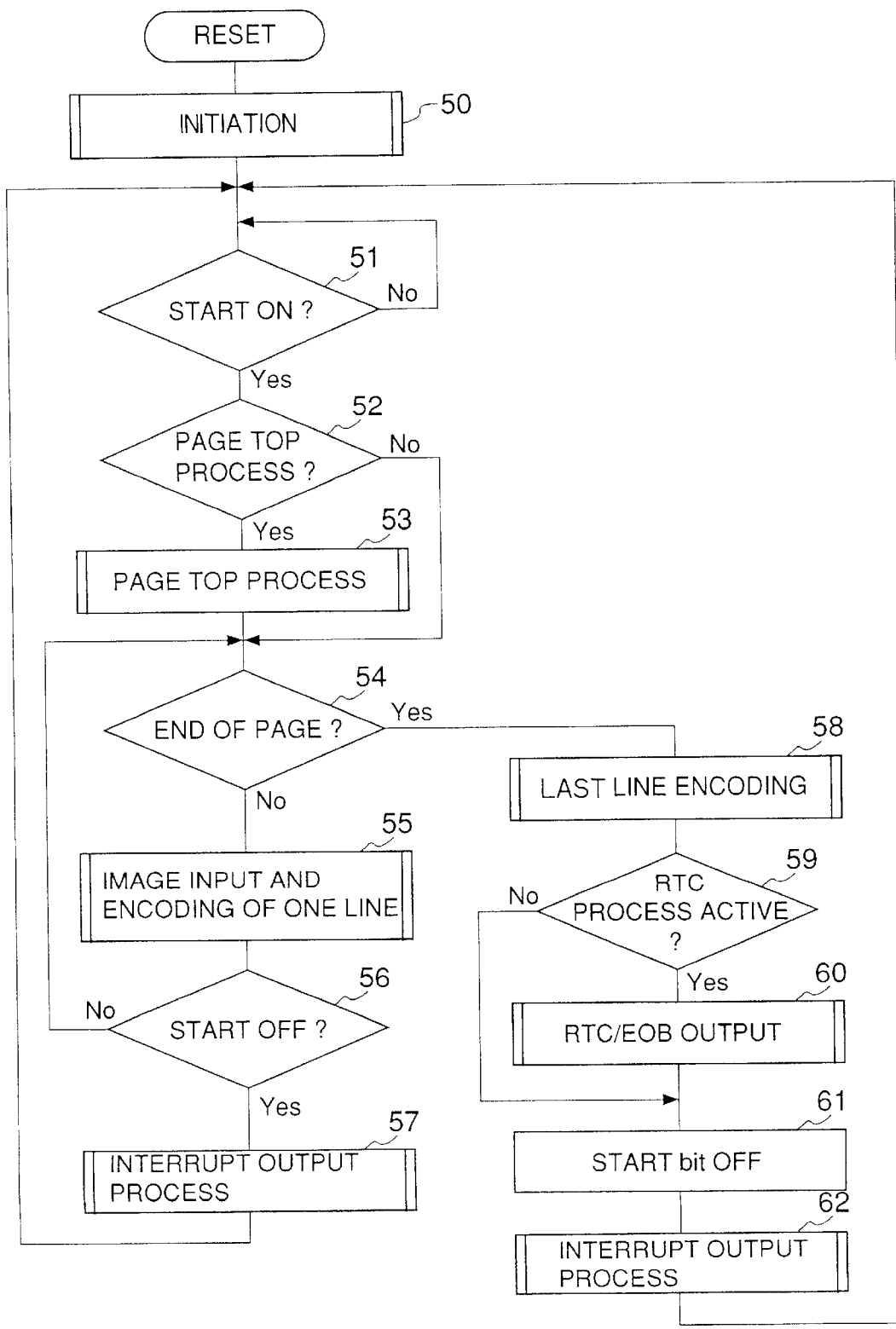
FIG. 28 is a flow chart explaining the operation of the encoder shown in FIG. 27.

FIG. 28 is a flow chart explaining the control operation to be executed by the control sequencer 509. Upon power-on or an input of a hardware reset signal, an initializing process is executed at Step 50, such as initializing a register group 536 shown in Table 1 provided for the encoding operation. Although the register group 536 contains similar registers to those shown in FIG. 18 and the function of them can be easily understood, all registers in Table 1 will be explained again.

Table 1

ECTL: Encode control register
ESTR: Encode status register
ECON: Encode configuration register
EIRR: Encode interrupt request register
EIRS: Encode interrupt request reset register
EIRM: Encode interrupt request mask register
ERES: Encode software reset register
EDOP: Code/Run-length output register
EKPR: Encode k parameter register
ERTC: Encoded RTC EOL number setting register
EPNR: Encoded byte number register
ELNR: Encoded line number register
EMCL: Encoded minimum bit number register
EWMC: All-white line encoded minimum bit number register
ENCT: Uncompression mode transition threshold register
EBPN: Black pixel setting register
EBLN: Consecutive black line number setting register
EXBC: Last black line serial number register
EXLC: Total encoded line number count register For the software reset, the register ERES is provided so that the initializing process at Step 50 may also be executed by entering a command from MPU 501 into ERES.

After the initializing process, Step 51 waits for an input of an encoding start instruction to ECTL. During this idling state, an encoding mode is selected from MH, MR, MMR, run-length, MR with uncompression, MMR with uncompression modes and inputted to ECON, and other registers in Table 1 are set with proper values in accordance with the selected encoding mode. For example, at the mode setting, a page top start is set to ECON, and the number of lines in the sub scan direction of a regular size original is set to ELNR if the number is known.

Upon reception of the encoding start instruction, it is first checked at Step 52 from the contents of ECON whether the page top start is active. If active, Step 53 executes a resetting of EXLC, other registers of the encoder 300, remaining codes if any in the code output port, or other data. If not active, the encoding process resumes the operation intercepted before the input of the encoding start instruction, and repetitively executes Steps 54, 55, and 56.

At Step 54, it is checked whether the end-of-page signal has been supplied via the image input port 505 or whether the contents of EXLC has reached the number of lines set by MPU 501 to ELNR. In the case of the page end, the flow branches to Step 58.

At Step 55, each block is instructed to execute the encoding process on the line unit basis, a completion of one line decoding is monitored, and an instruction of inputting one line image data is supplied to the image input port 505 to monitor an input completion signal. Upon completion of the one line image data encoding, the contents of EXLC are incremented by "1" and at the same time the input completion signal is monitored. After the completion of the one line image data encoding and the reception of the input completion signal, it is checked at step 56 whether the encoding start instruction from MPU 501 has been cancelled. This check is executed after the one line image data encoding so that the line encoding is executed on the one line unit basis, irrespective of whether an interrupt is issued at the intermediate position of a line.

If the encoding start instruction has been cancelled, the encoding operation is terminated. Then, an interrupt active signal and an interrupt source are set to EIRR at Step 57 if the interrupt is not masked by EIRM to inform the interrupt to MPU 501 via the system interface port 504. Thereafter, the flow returns to Step 51. This return to Step 51 is conducted by MPU 501 before the encoding operation of one page is not still completed, as different from the return to Step 51 after one page encoding is completed. This return to Step 51 is used upon completion of one line encoding to request a reception of any command for the next line encoding during the idling state at Step 51.

Figure 30:
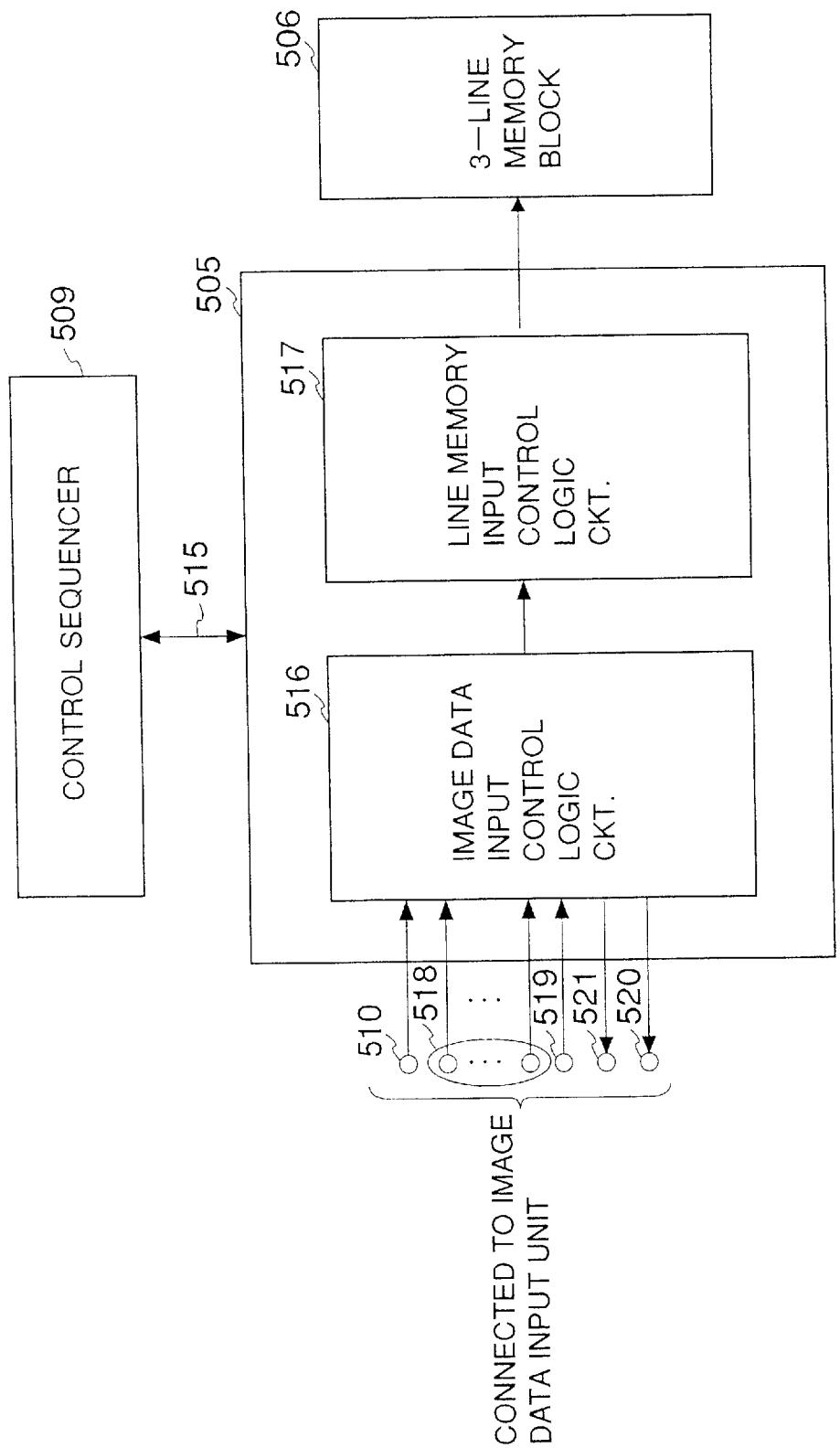
FIG. 30 is a detailed block diagram of the image input port shown in FIG. 27.

The completion of one page encoding at Step 54 is detected whether the lines set by ELNR has been encoded or the end-of-page signal has been supplied from a page end input terminal 510 shown in FIG. 30 of the image input port 505. This one page encoding completion is a normal termination of the image data encoding operation. In order to encode all the inputted image data, the last line is encoded at Step 58. At Step 59 the contents of ECON are checked to determine whether an RTC code for the MH and MR coding or an E of B code for the MMR coding is to be outputted after the encoded image data. If to be outputted, at Step 60 an RTC or E of B code is outputted and EOL codes as many as set to ERTC are outputted. At Step 61, the bit of the encoding start instruction is turned off, and at Step 62 an interrupt active signal with its source is set to EIRR to return to Step 51. The interrupt active signal set to EIRR can be reset by using EIRS.

Figure 29:
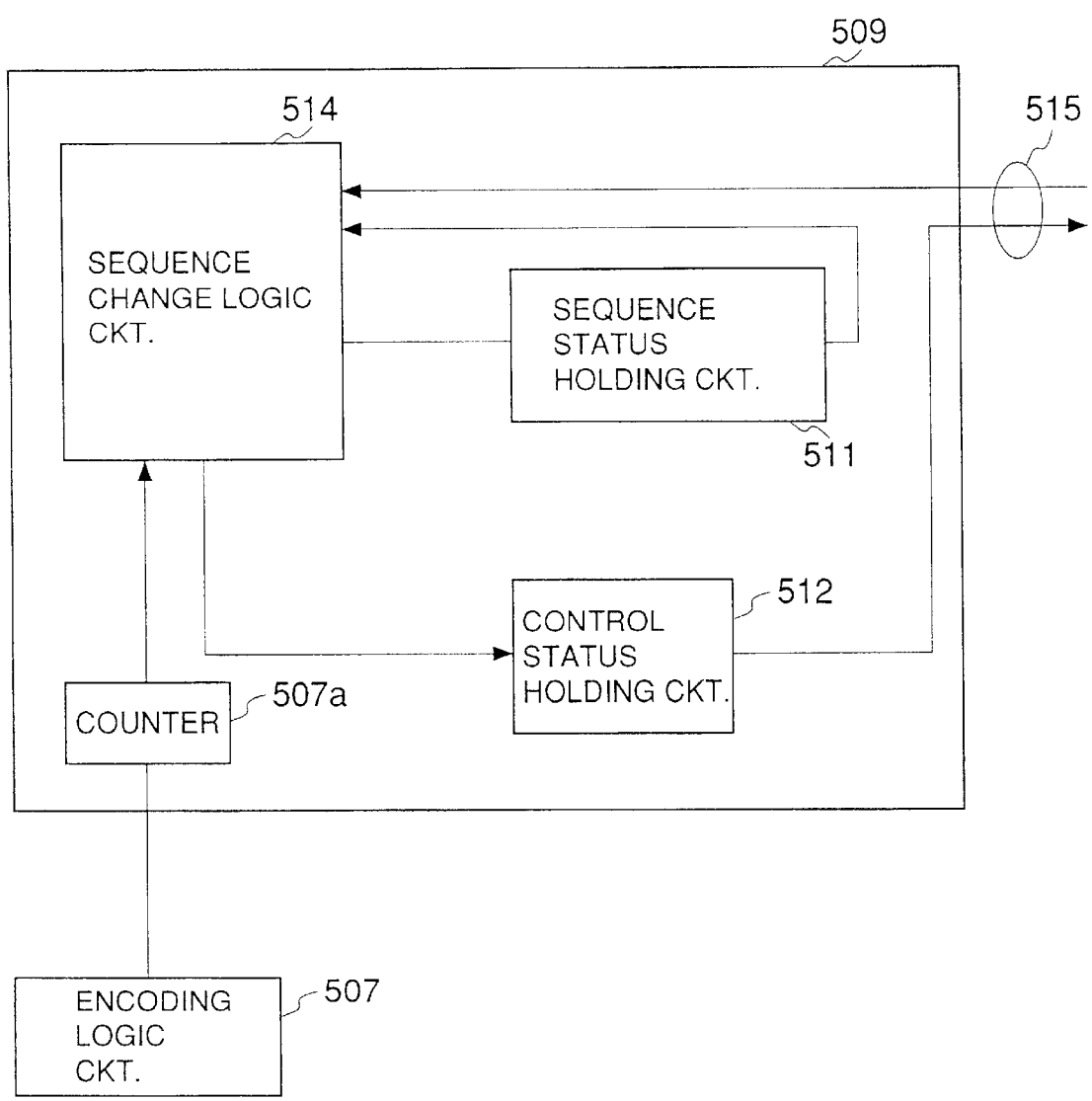
FIG. 29 is a detailed block diagram of the control sequencer shown in FIG. 27.

FIG. 29 is a basic hardware arrangement of the control sequencer 509. There are four main constitutional elements, including a sequence status holding circuit 511 for holding a sequence status, a control status holding circuit 512 for holding a control status, a counter 507a for counting the number of encoded lines, and a sequence change logic circuit 514 for changing the sequence in response to the counter 507a. In operation, necessary control information from the logic circuits excepting the control sequencer 509 is supplied via the control bus 515. In accordance with the supplied control information and the contents of the sequence status holding circuit 511, the sequence change logic circuit 514 generates new necessary control information which is outputted via the control status holding circuit 512 to each element of the encoder 300. Any specific logic is not used, but a sequence control commonly used is used.

FIG. 30 is a block diagram showing the structure of the image input port 505. In this embodiment, the image input port 505 has an image data control logic circuit 516 and a line memory control logic circuit 517. The image input port 505 is connected via the control bus 515 to the control sequencer 509. For example, the encoding start and interception is instructed by a command from MPU 501, and the number of image data bits per line is set to EPNR. A plurality of image data bits are inputted in parallel via image data input terminals 518. An MSB bit of the image data is defined as the image data bit appeared earliest. The bit length of the image data to be inputted in parallel is.set to ECON in accordance with the performance of the image data input unit 502 and the necessary data rate or speed. This bit length is set to ECON by MPU 501 before the encoding start instruction. The bit length may be fixed, for example, to 8 bits or 16 bits.

As in the case of a general direct memory access (DMA) control, an image data input request from the image data input unit 502 is received via a data transfer request terminal 519, and an image data input acceptance signal and an image data read signal are outputted synchronously via an image data input acceptance terminal 520 and an image data read terminal 521. The terminal characteristic to this embodiment is an end-of-page input terminal 510. An end-of-page signal is supplied not only to MPU 501 but also to the encoder 300 when the image data input unit 502 detects the end of a page. When the terminal 510 becomes active while the last line image data is inputted, the image data input control logic circuit 516 of the encoder 300 detects this active state and informs it to the control sequencer 509 via the control bus 515. This operation corresponds to Step 54 shown in FIG. 28.

Figure 31:
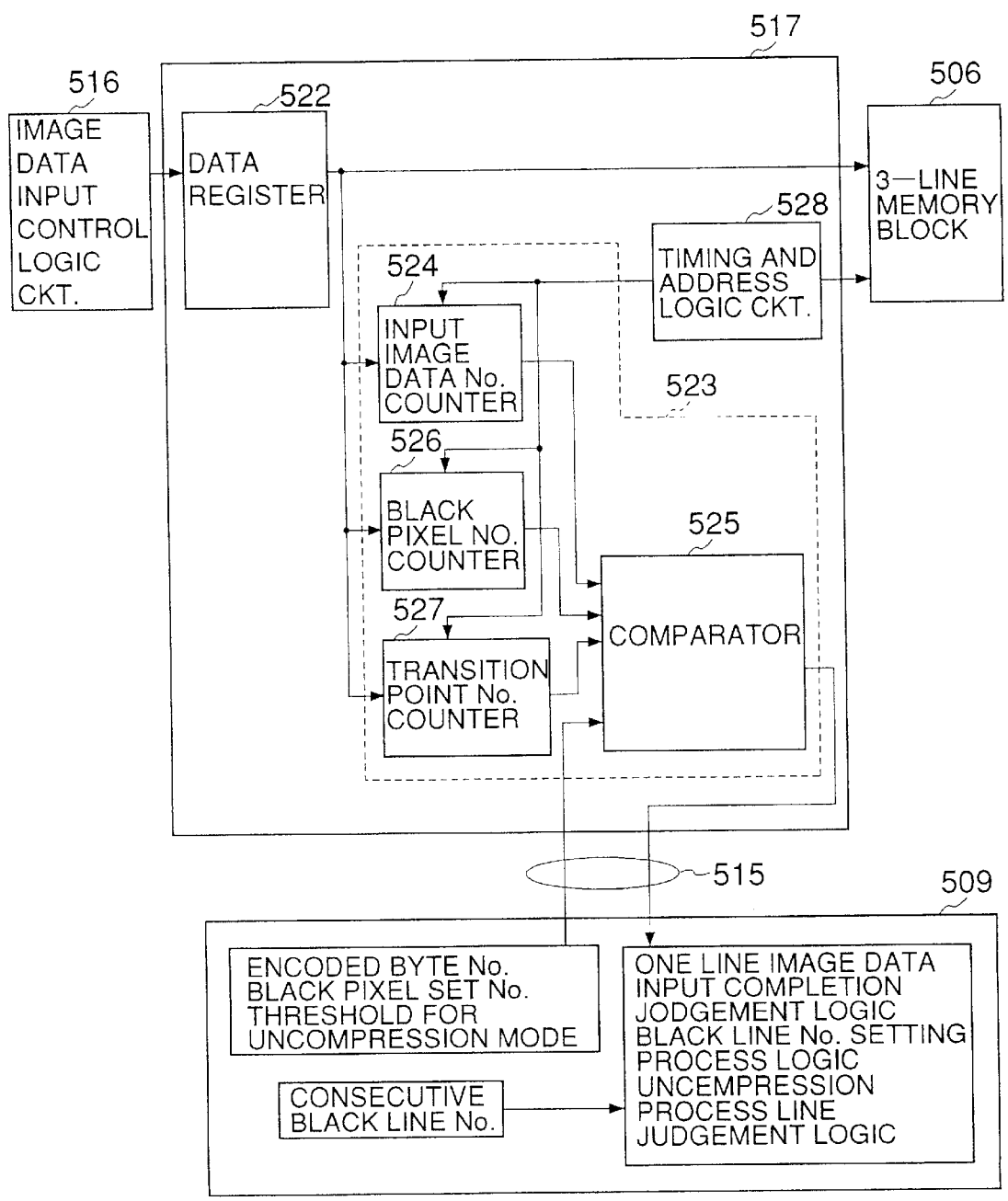
FIG. 31 is a detailed block diagram of the line memory input control logic circuit shown in FIG. 27.

FIG. 31 is a block diagram showing the structure of the line memory input control logic circuit 517. This circuit 517 receives image data from the image data input control logic circuit 516 and stores it in the three line memory block 506, while controlling the image data on the line unit basis. The image data is loaded to a data register 522, outputted to the three line memory block 506. The image data is processed by a comparator counter logic circuit 523 as in the following.

Bytes of input image data are counted to determine whether the image data of one line has been inputted. Specifically, a comparator 525 compares the count in an input image data counter 524 with the value set to EPNR by MPU 501. A black pixel counter 526 counts the number of black pixels on one line. The counter 525 compares the number of black pixels with the value set to EBPN. If the number of black pixels is greater than the value set to EBPN, the line is judged as a line having black pixels, and a flag is set to the line and a black pixel line signal is supplied via the control bus 515 to the control sequencer 509. If a black pixel is not detected, a flag indicating an all-white line is set and an all-white line signal is supplied to the control sequencer 509. Upon reception of the black pixel line signal, the control sequencer 509 compares the value set to EBLN with the number of consecutive black pixel lines. If the number of consecutive black pixel lines is greater than the value set to EBLN, the value set to EXLC is set to EXBC. The line number satisfying both the contents of EBPN and EBLN among the lines from the page top line to the last encoded line is set to EXBC.

The other process to be executed by the comparator counter logic circuit 523 is a process of counting transition points on one line. This process becomes necessary when an MR with uncompression coding mode or an MMR with uncompression mode is selected. The comparator 525 compares the count of a transition point counter 527 with the value set to ENCT. If the count is greater than the set value, a flag indicating a necessity of an uncompression process is set, and an uncompression encoding is informed to the control sequencer 509. The control sequencer 509 checks the flag when the input image data line is read as the encode line image data to determine whether MR, MMR, or uncompression coding is executed. The flag of the line set in the above manner may be checked, or the following method may be incorporated to control the encoding mode more finely.

For the MR coding scheme, CCITT has recommended to control the one-dimensional encoding and two-dimensional encoding by the value of a k parameter. In this embodiment, the encoder 300 selects either the oneor two-dimensional encoding from the value set to EKPR. The amount of generated codes differs between the one- and two-dimensional encoding schemes even if the line has the same number of transition points. It is therefore important to use different check criteria between the one- and two-dimensional encoding schemes in order to prevent an increase of the amount of generated codes. Statistically, the amount of generated codes exceeds the amount of pixels if the number of transition points per one line is about 25% for the one-dimensional encoding scheme, and about 20% for the two-dimensional encoding scheme. Therefore, a threshold value of the number of transition points on a one-dimensionally encoded line may be set greater than that on a two-dimensionally encoded line. Alternatively, for the two-dimensionally encoded line, the number of transition lines on a reference line is also checked wherein if the number of transition points on one of the encoded line and reference line exceeds a threshold value, the uncompression mode is executed. In this manner, an increase of the amount of generated codes can be avoided more reliably. Even with such a fine control, the amount of hardware increases only slightly. If even a slight increase of hardware is not permitted, only one threshold value may be used to determine the uncompression mode of each encoded line. In this case, the performance degradation is only several %, posing no problem in practical use.

Image data is written in the three line memory block 506 in parallel with the above process, synchronously with a signal from a timing and address generating logic circuit 528. Writing image data is executed for an image data input line memory and not for the encode line memory and reference line memory. This data writing can be executed in parallel with and independently from the encoding operation as shown at Step 55 of FIG. 28. Namely, the encoding operation and the image data input process are executed in a pipelining manner, and the image data of one line is inputted synchronously with the timing of the image data input unit 502, independently from the encoding speed. An input of image data is activated by the image data transfer request from the input unit 502, and continues until the interrupt is issued as explained with FIG. 28.

Figure 32:
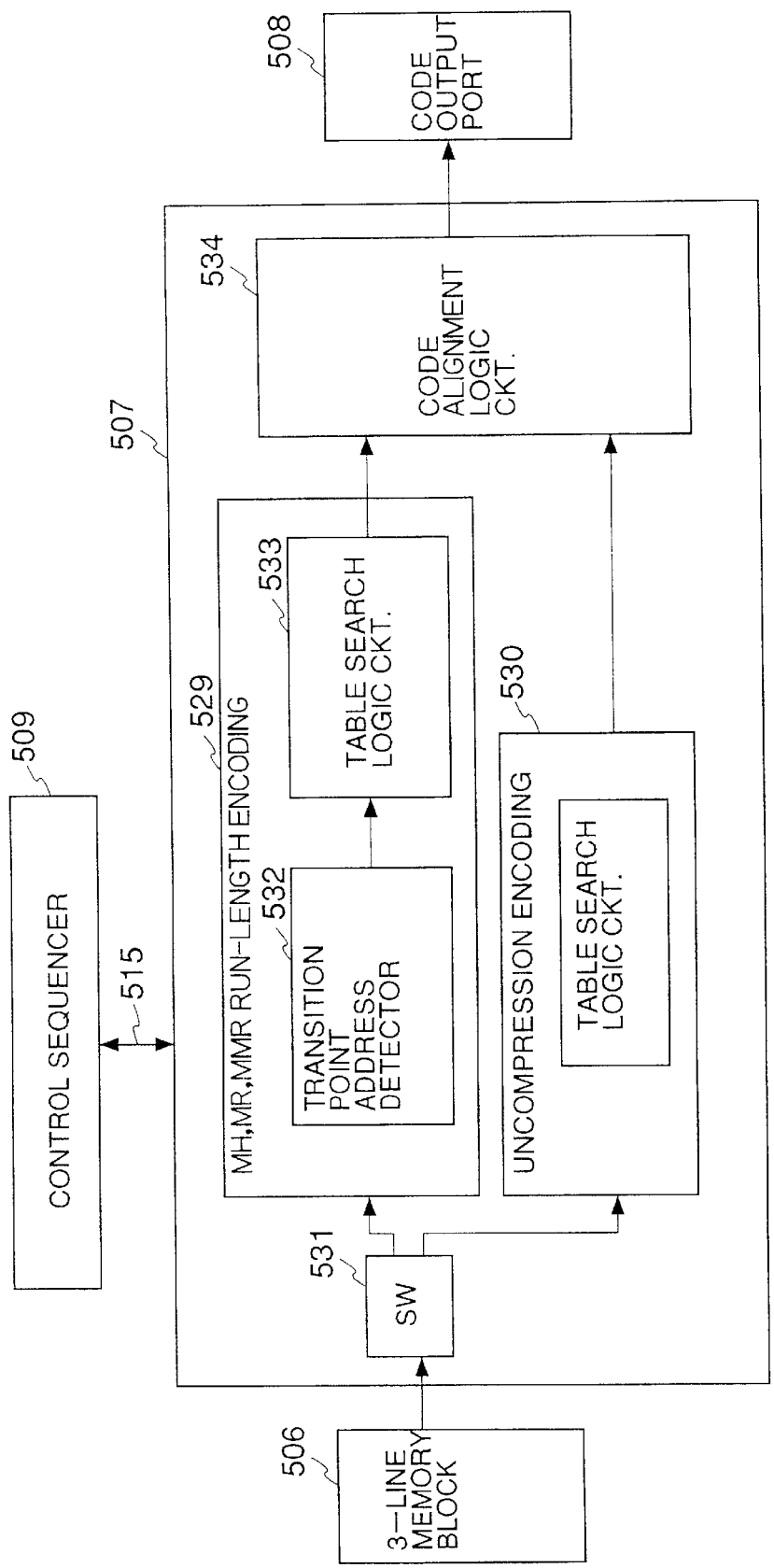
FIG. 32 is a detailed block diagram of the encoding logic circuit shown in FIG. 27.

FIG. 32 is a block diagram showing the structure of the encoding logic circuit 507. This circuit receives image data from the line memory block 506 and generates codes by the encoding scheme recommended by CCITT. This circuit has a encoding logic circuit 529 for generating MH, MR, MMR, or run-length codes and an uncompression encoding logic circuit 530 for generating uncompressed codes. In the encoding with uncompression mode, one of the circuits 529 and 530 is selected by the control sequencer 509. The control sequencer 509 checks the flag set by the image input port 505 and indicating whether the number of transition points per line exceeds the threshold value, and activates a switch 531 to the selected circuit.

In the encoding logic circuit 529, a transition point address detect circuit 532 detects the address of a transition point, and a table search logic circuit 533 generates an MH, MR, MMR, or run-length code basing upon the address difference. The encoding logic circuit 529 is realized by a general random logic and a table reference scheme in a pipelining manner at a high speed.

The uncompression encoding logic circuit 530 outputs almost the same data as the input image data although it encodes the image data. As recommended by CCITT, image data can be encoded relatively in short time by paying attention to the insertion of "1" in a series of consecutive "0s". This encoding prevents a minus compression increasing the amount of codes greater than the amount of the input image data, and the encoding process can be executed at a high speed by using the table reference scheme or the like. Generated codes are aligned with an effective bus width of the code output port 508 by a code aligning logic circuit 534, and outputted to the code output port 508. In this manner, the three-line memory block 506 and encoding logic circuit 507 are operated in a pipelining manner, the encoding logic circuit 507 is divided into fine blocks to execute a pipeline operation for generating MH, MR, MMR, or run-length codes, and the uncompression process is effectively used, allowing one code word to be encoded approximately during one machine cycle.

Figure 33:
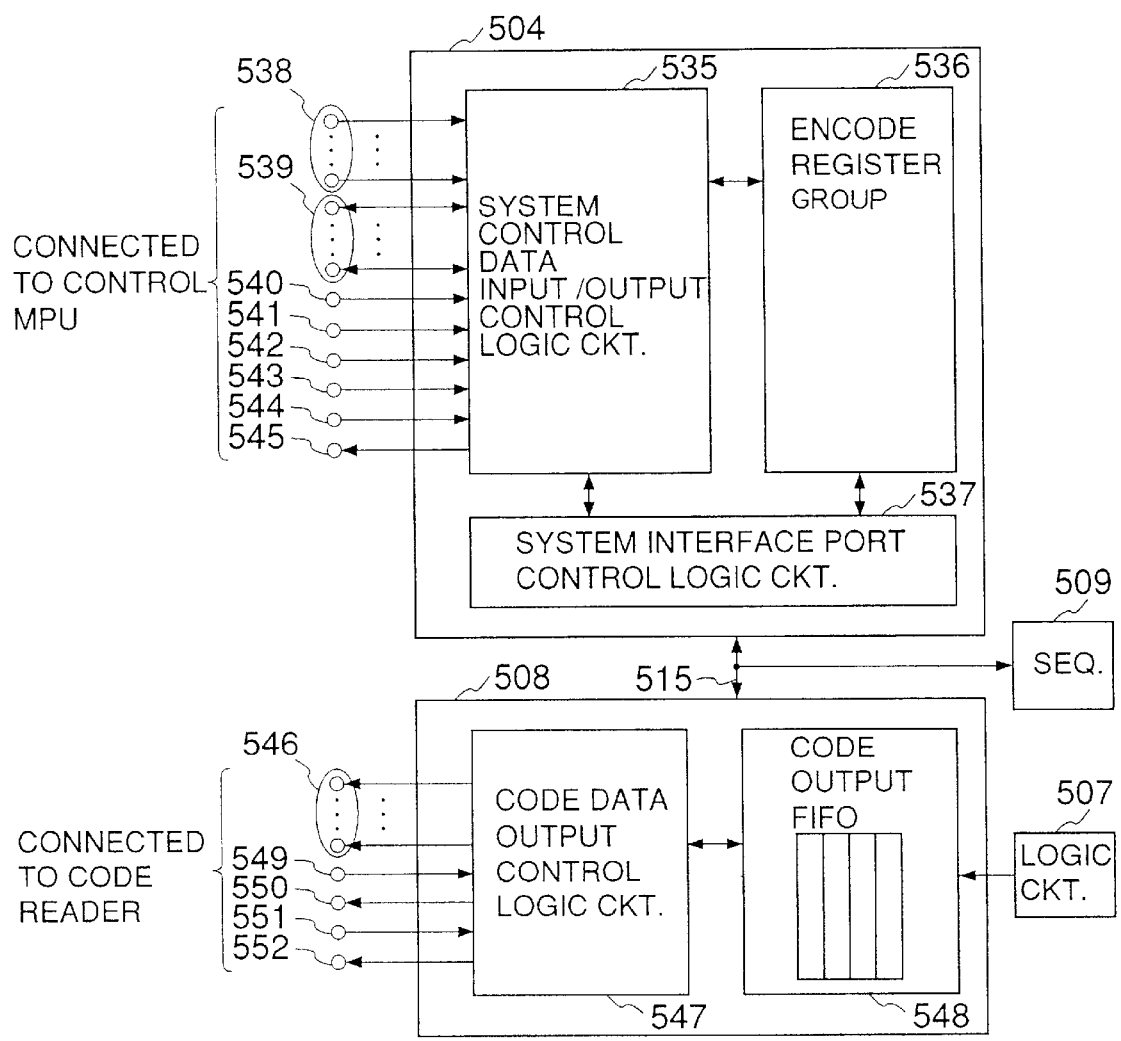
FIG. 33 is a detailed block diagram of the system interface port and code output port.

As shown in FIG. 33, the system interface port 504 interfacing with MPU 501 has a system control data input/output control logic circuit 535, the register group 536 shown in Table 1, and a system interface port control logic circuit 537. The system interface port 504 includes address terminals 538 for designating an address of each register of the register group, data input/output terminals 539, a chip select terminal 540 which is made active while a register of the register group is accessed, a data strobe terminal 541, a read/write terminal 542, a data width switching terminal 543 for determining the data bus width of 8 bits or 16 bits, a reset terminal 544 for the hardware reset of the encoder, and an interrupt request terminal 545 for requesting an interrupt to MPU 501. Arrows at each terminal indicate whether the terminal is an input or output terminal. An arrow away from the encoder 300 indicates an output terminal, an arrow toward the encoder 300 indicates an input terminal, a double head arrow indicates an input/output terminal. A signal on the data width switching terminal 543 is also effective for the width of data on code data output terminals 546 of the code output port 508. If a data width of 8 bits is selected, data of 8 bits is outputted from the code data output terminals 546.

As shown in FIG. 33, the code output port 508 has a code data output logic circuit 547 and a code output FIFO 548. In outputting codes, a code transfer request is outputted from a code data transfer request terminal 550 to an external bus master, and after a code transfer permission terminal 549 and code read terminal 551 become active, the codes are outputted. A ready terminal 552 to be used for requesting the external bus master to extend the data transfer cycle is also provided. The effective code bus width is determined by a signal on the data width switching terminal 543 of the system interface port 504 as described above.

Versatile functions are provided to the system side, including not only a function of switching the bus width between 8 bits and 16 bits, but also a function of detecting an all-white line, a function of outputting code data to the system side, and other functions. EWMC is provided to set the minimum number of bits for an all-white line. EMCL is provided to control the number of fill bits in order to satisfy the minimum transmission time relative to the reception side record time recommended by CCITT. Lines other than the all-white line are controlled to have a code amount less than the value set to this register EMCL. The minimum transmission time (minimum bit number) is not always required to be satisfied, because the all-white line is recorded at the recording unit simply by feeding a recording sheet without recording a black pixel. EWMC is provided to deal with such a case as the number of bits is reduced to speed up the transmission. If the all-white line is not necessary to control its fill bits, this requirement is set to ECON. In this case, the value set to EMCL is applied to all lines. There is also provided a function of automatically executing the fill bit control for each line. The all-white line detected by the image input port 505 is transferred as a flag to the control sequencer 509 and set to ESTR of the register group 536 shown in Table 1. Therefore, MPU 501 can know whether a particular line is an all-white line or not by reading ESTR.

Code data can be read by MPU 501 not from the code data output terminals 546 but by directly accessing EDOP. This is efficient for evaluating the encoding operation. The contents of EXBC and EXLC are updated at any time during the encoding operation by the control sequencer 509 and changed in real time. The write operation by the control sequencer 509 and the read operation by MPU 501 are executed independently from each other. The contents of the other registers shown in Table 1 can be accessed by the control sequencer 509 via the system interface port control logic circuit 537 and outputted to the system interface port 504.

Figure 34:
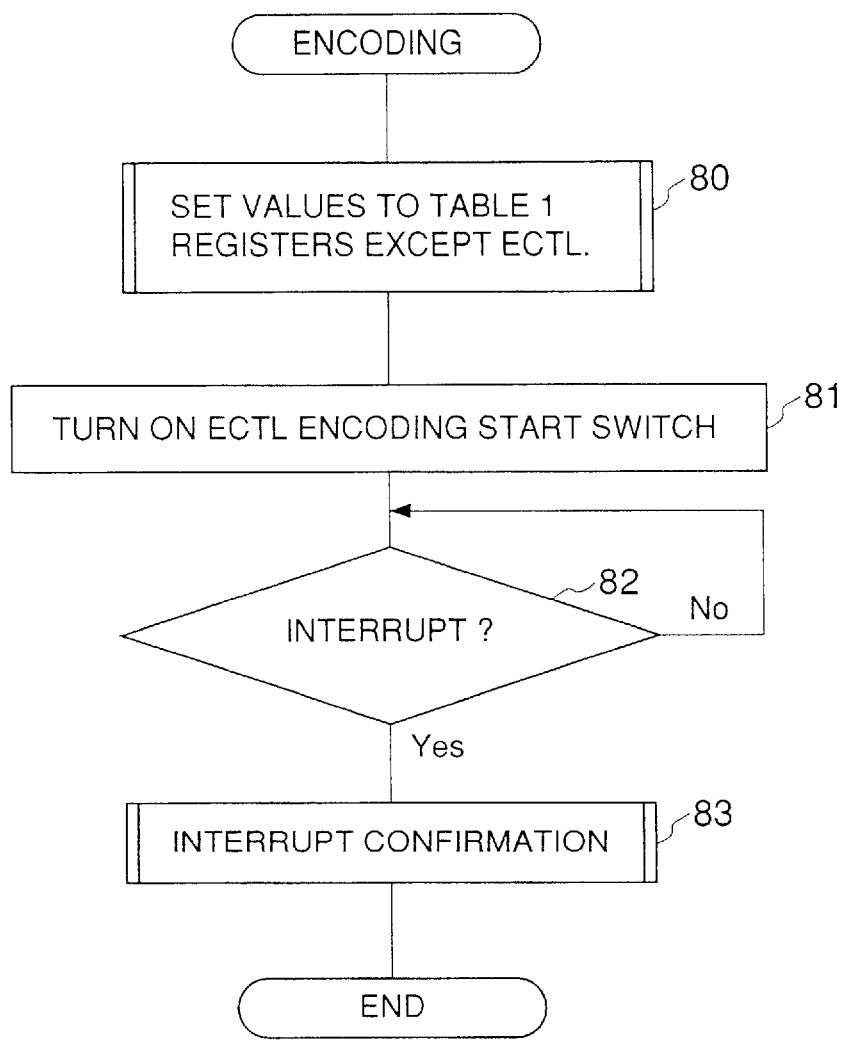
FIG. 34 is a flow chart explaining the operation of MPU relative to the encoder shown in FIG. 27.

FIG. 34 is a flow chart explaining the operation on the side of MPU 501. The encoder 300 supports a plurality of encoding modes. The unit of process at MPU 501 is one page. The encoder can detect an end of page by itself once the start instruction is entered. At Step 80, the system controller MPU 501 sets proper values to the registers except ECTL in accordance with the selected encoding mode, during the idling period at Step 51 shown in FIG. 28. Thereafter, at Step 81 an encoding start switch is turned on to set the encoding start instruction to ECTL. After the start of encoding, at Step 82 an interrupt request from the encoder 300 is monitored. Upon reception of the interrupt request, the contents of the interrupt are checked at Step 83 to execute a necessary system control. If the system requires for an urgent interception of the encoding operation, ERES is accessed to reset the system. If the encoding operation is required to be terminated after encoding one line, a start switch is turned off to cancel the start instruction set to ECTL. The encoder 300 can operate with the above simple control procedure by MPU 501. Therefore, the load of MPU 501 can be reduced and the configuration of the high speed image data reading and encoding system becomes very simple.

As described above, prior to the start of encoding, proper values are set to the registers necessary for the encoding. After the encoding is activated, lines are sequentially encoded without requiring any control signal from the system controller. The encoding is intercepted upon detection of the end-of-page signal or the completion of encoding all lines set to the register, and thereafter an RTC signal or E of B signal is outputted if necessary. Image data can be supplied at a constant transmission rate slower than an upper limit of the encoding speed, synchronously with the timing of the data input unit, and independently from the encoding speed. The image data is always stored in at least one image input line memory during the encoding operation. Accordingly, the real time control by MPU 501 controlling the image data reading and encoding system is only a command of instructing an encoding start. The load of MPU 501 can be reduced and the configuration of the high speed image data reading and encoding system becomes very simple. Furthermore, it is not necessary to use an image data input buffer memory and a specific control operation for the image data input, simplifying the system structure and control.

The encoder has the function of efficiently executing the uncompression encoding mode. Therefore, the amount of generated codes can be suppressed less than the amount of image data, and the capacity of the code memory will not be occupied too much, improving the bus throughput and efficiently using the line memory. Further, since the uncompression encoding which is relatively simple is incorporated, the encoding transmission rate of a fine image with a large load of the encoding time can be improved without using high speed devices.

Still further, a line having effective black pixels can be checked from an original to be read and encoded. Consecutive black lines of a page are always monitored. Therefore, unnecessary processes can be dispensed with by monitoring an image area containing meaningless information.

The number of encoded lines, code data, parameter values can be read in real time even during the encoding operation, providing an easy evaluation of the encoding. The simple control and versatile use of the system are further ensured by the provision of a function of detecting an all-white line and EWMC for adjusting the fill bits of the all-white line in order to reduce the number of code bits and speed up the operation of the facsimile, by allowing to set both the system and code bus widths, by setting a page intermediate start instruction to ECTL during the idling state, and by other various functions.

What is claimed is:

1. An image signal processing apparatus which decodes a coded signal corresponding to a scanned single page into an image signal comprising:

a command inputting means for inputting either a decoding start command from a page top position with respect to said scanned single page of said coded signal or said decoding start command from a page intermediate position with respect to said scanned single page of said coded signal intermediately positioned within a serially coded signal; and a decoding means for decoding said coded signal into said image signal either from said page top position of said coded signal or from said page intermediate position of said coded signal according to said inputted decoding start command.

2. An image signal processing apparatus comprising:

a decoding means decoding a coded signal into an image signal;

an image bus for connecting said decoding means to at least an image memory and a recording unit; and a transfer means for transferring said decoded image signal to said recording unit and said image memory simultaneously.

3. An image signal processing apparatus comprising:

a decoding means for decoding a coded signal into an image signal;

an image bus for connecting said decoding means to at least an image memory for storing at least a portion of said image signal for use in the event of pausing of a recording operation and a recording unit for recording said image signal;

a first transfer means for transferring a same said decoded image signal to said recording unit and said image memory simultaneously:

a second transfer means for transferring, after and pausing of said recording operation, a decoded image from said decoding means to said recording unit after transferring a portion or an entirety of said image signal stored in said image memory to said recording unit.

4. An image signal processing apparatus which encodes an image signal into a coded signal comprising:

a system interface unit including an encode register for controlling one of an encoding start and an end-of-operation supplied from a control sequencer;

said control sequencer for continuing said encoding opation until said end-of-operation is ordered under a previously set parameter before an input of a starting signal;

an image signal input unit including an input terminal for receiving a page end signal indicating a last line pixel data; and an encoding means receiving said image signal from said input terminal and said page end signal with said last line pixel data of said image signal simultaneously, for encoding said image signal, wherein the encoding means inserting a page end upon occurrence of either one of said page end signal detected by said control sequencer and number of coded lines indicated by said system interface unit.

* * * * *